US012204067B1

(12) United States Patent
Hu et al.

(10) Patent No.: US 12,204,067 B1
(45) Date of Patent: Jan. 21, 2025

(54) AUTOMATIC RECOGNITION METHOD FOR DRY QUASI-STATIONARY FRONT IN KUNMING, YUNNAN, CHINA

(71) Applicant: Chengdu University of Information Technology, Chengdu (CN)

(72) Inventors: Wendong Hu, Chengdu (CN); Yongkai Zhang, Chengdu (CN); Hongping Shu, Chengdu (CN); Yanqiong Hao, Chengdu (CN); Tiangui Xiao, Chengdu (CN); Yan Chen, Chengdu (CN); Fei Luo, Chengdu (CN); Jianhong Gan, Chengdu (CN); Ying Zhang, Chengdu (CN); Xiaohang Wen, Chengdu (CN); Taisong Xiong, Chengdu (CN); Jian Shao, Chengdu (CN); Wenjie Zhou, Chengdu (CN); Balin Xu, Chengdu (CN); Huahong Li, Chengdu (CN); Yixue Deng, Chengdu (CN); Jingyi Tao, Chengdu (CN)

(73) Assignee: Chengdu University of Information Technology, Chengdu (CN)

( * ) Notice: Subject to any disclaimer, the term of this patent is extended or adjusted under 35 U.S.C. 154(b) by 0 days.

(21) Appl. No.: 18/602,114

(22) Filed: Mar. 12, 2024

(30) Foreign Application Priority Data

Sep. 14, 2023 (CN) .......................... 202311184826.3

(51) Int. Cl.
*G01W 1/06* (2006.01)
(52) U.S. Cl.
CPC ..................... *G01W 1/06* (2013.01)
(58) Field of Classification Search
CPC ...... G01J 5/48; G01J 5/485; G01J 2003/2843; G01J 5/00; G01K 1/024; G01K 1/026;
(Continued)

(56) References Cited

U.S. PATENT DOCUMENTS 5,828,332 A * 10/1998 Frederick .............. G01S 13/953
   342/197
9,869,766 B1 * 1/2018 Breiholz ............... G01S 13/106
(Continued)

FOREIGN PATENT DOCUMENTS

CN    103020959 A    4/2013
CN    110657834 A    1/2020
(Continued)

OTHER PUBLICATIONS

Tao Yun, et al., The Climate Correlation Analysis between the Cold Wave in Yunnan and Kunming Quasi-Stationary Front, Journal of Catastrophology, 2018, pp. 99-105, vol. 33 No. 2.
(Continued)

*Primary Examiner* — Daniel R Miller
*Assistant Examiner* — Eric Sebastian Von Wald
(74) *Attorney, Agent, or Firm* — Bayramoglu Law Offices LLC

(57) ABSTRACT

An automatic recognition method for a dry quasi-stationary front in Kunming, Yunnan, China is provided. The automatic recognition method includes: reading data; calculating, by a differential method, a temperature lapse rate between each layer of each point from a ground surface to 650 hPa, and acquiring a maximum inversion trend value; acquiring an initially selected inversion distribution based on the maximum inversion trend value; removing a nighttime clear sky radiation inversion, retaining only a frontal inversion, and binarizing (0, 1); finding a boundary between inversion and non-inversion; removing the abnormal candidate frontal points, and acquiring frontal nodes; removing meso- and micro-scale systems; and performing one-dimensional Gaussian filtering on longitude data of the frontal nodes, and connecting the filtered frontal nodes to acquire a quasi-stationary front in Kunming, Yunnan, China.

7 Claims, 19 Drawing Sheets

(58) Field of Classification Search
CPC .. G01K 13/024; G01K 1/146; G01K 2213/00; G01W 1/06; G01W 1/10; G01W 1/00; G01W 1/02; G01W 2203/00; G01W 2001/006; G06F 17/10; G06F 17/18; G06F 18/10; G06F 2111/10; G06F 17/12; G06F 17/16; G06F 17/17; G06N 7/01; G06Q 10/04; G06T 2207/30192; Y02A 90/10; Y02A 50/00
See application file for complete search history.

(56) References Cited

U.S. PATENT DOCUMENTS

| | | | |
|---|---|---|---|
| 2012/0185414 | A1 | 7/2012 | Pyle et al. |
| 2014/0190248 | A1* | 7/2014 | Moran ............... G01W 1/02 73/170.16 |
| 2017/0329048 | A1* | 11/2017 | Lemos ............... G06F 17/18 |

FOREIGN PATENT DOCUMENTS

| | | | | |
|---|---|---|---|---|
| CN | 111414991 | A | | 7/2020 |
| CN | 114035172 | A | * | 2/2022 |
| CN | 114707105 | A | | 7/2022 |
| CN | 115082791 | A | | 9/2022 |
| CN | 115406911 | A | * | 11/2022 ........... G01K 11/006 |
| CN | 115878731 | A | | 3/2023 |
| CN | 116030401 | A | | 4/2023 |
| CN | 115525854 | B | * | 5/2023 |

OTHER PUBLICATIONS

Duan Xu, et al., A Comparative Analysis of the Kunming Quasi-stationary Frontal Position and Frontogenesis Function with Three Different Temperature and Humidity Parameters, Chinese Journal of Atmospheric Sciences, 2018, pp. 301-310, vol. 42 No. 2.

Ding Xinya, Research on Automatic Front Recognition Based on Multi-element Fusion, Master of Engineering in Electronics and Communication Engineering in Domain Title, Graduate School of National University of Defense Technology, 2019, pp. 1-59.

Di Zhao, et al., Objective detection of the Kunming quasi-stationary front, Theoretical and Applied Climatology, 2019, pp. 1405-1418, vol. 138.

* cited by examiner

AUTOMATIC RECOGNITION METHOD FOR DRY QUASI-STATIONARY FRONT IN KUNMING, YUNNAN, CHINA

CROSS-REFERENCE TO THE RELATED APPLICATIONS

This application is based upon and claims priority to Chinese Patent Application No. 202311184826.3, filed on Sep. 14, 2023, the entire contents of which are incorporated herein by reference.

TECHNICAL FIELD

The present disclosure belongs to the technical field of meteorological disaster prevention and mitigation, and in particular relates to an automatic recognition method for a dry quasi-stationary front in Kunming, Yunnan, China.

BACKGROUND

A front is formed when a large area of warm and cold air meets in the troposphere. Because the cold air is denser than the warm air, the warm air climbs above the cold air, forming a steep interface or front. A front is a narrow and steep transition zone between two air masses with different properties. It is one of the most important weather systems in the mid to high latitude atmosphere, where various meteorological elements change drastically. On a horizontal scale, the front generally extends several hundred to several thousand kilometers. At a near ground surface level, the horizontal scale of the front is generally several tens or only a few kilometers.

The weather on Earth varies greatly, but in mid to high latitudes area, complex weather is almost entirely concentrated near the front. Due to the significant weather indicative function of the front, it is an extremely important weather system and has attracted the attention of professionals. Frontal analysis is a core of weather monitoring, forecasting, and early warning work.

The quasi-stationary front in Kunming, Yunnan, China is an important weather system on the Yunnan-Guizhou Plateau of China. November to April of the following year is the dry season in Yunnan, and warm and dry southwest airflow prevails. In the dry season, the quasi-stationary front in Kunming, Yunnan, China is of a dry type, with significant differences in humidity on both sides of the front and a clear dry-wet interface.

When there is a quasi-stationary front in Kunming, Yunnan, China, it can cause widespread cloudy and rainy weather, which may lead to freezing rain in winter. Further, if it is accompanied with strong southwest water vapor transfer from the south trough or trough of Bengal Bay, it can cause large area rain and snow weather, leading to serious meteorological disasters and secondary and derivative disasters, and causing heavy losses. Therefore, accurately recognizing the quasi-stationary front in Kunming, Yunnan, China is of great significance for weather analysis, diagnosis, and forecasting in Yunnan, Guizhou and downstream areas such as eastern, central, and southern China. However, so far, the recognition of quasi-stationary front in Kunming, Yunnan, China has still been achieved by forecasters based on experience, which has the drawback of subjective determination and seriously affects the automation level of weather forecasting and early warning work.

The front in the following text refers to quasi-stationary front in Kunming, Yunnan, China.

SUMMARY

In response to the shortcomings in the prior art, the present disclosure provides an automatic recognition method for a dry quasi-stationary front in Kunming, Yunnan, China. The present disclosure solves the problems of manual recognition such as dependence on subjective experience, low analysis efficiency, and easy misjudgment in the prior art.

To achieve the above objective, the present disclosure adopts the following technical solution.

The present disclosure provides an automatic recognition method for a dry quasi-stationary front in Kunming, Yunnan, China, including the following steps:

S1: reading the data of an atmospheric temperature at 2 m above a point at ground surface, an atmospheric temperature at each layer of each point from the ground surface to 650 hPa, and geopotential height data;

S2: calculating, by a differential method, a temperature lapse rate between each layer of each point from the ground surface to 650 hPa, and acquiring a maximum inversion trend value of each point;

S3: acquiring an initially selected inversion distribution based on the maximum inversion trend value;

S4: removing a nighttime clear sky radiation inversion from the initially selected inversion distribution, retaining only a frontal inversion, and binarizing (0, 1);

S5: finding a boundary between inversion and non-inversion on a binarized (0, 1) inversion distribution, and acquiring candidate frontal points;

S6: calculating an east-west distance between each of the candidate frontal points and an overall average position thereof, removing the abnormal candidate frontal points based on the east-west distance, and acquiring frontal nodes;

S7: removing meso- and micro-scale systems; and

S8: performing one-dimensional Gaussian filtering on longitude data of the frontal nodes based on a removal result, and connecting the filtered frontal nodes to acquire a quasi-stationary front in Kunming, Yunnan, China.

The present disclosure has the following beneficial effects. The present disclosure is implemented by: acquiring the initially selected inversion distribution through the maximum inversion trend value; removing nighttime clear sky radiation inversion and only retaining frontal inversion; binarizing the frontal inversion (0, 1); acquiring the candidate frontal points, and acquiring the frontal nodes based on a binarization (0, 1) result; removing meso- and micro-scale systems by considering that the quasi-stationary front in Kunming, Yunnan, China is a weather scale system; performing one-dimensional Gaussian filtering on the longitude data of the frontal nodes; and connecting the filtered frontal nodes to determine the position of the quasi-stationary front in Kunming, Yunnan, China. The present disclosure can automatically recognize the quasi-stationary front in Kunming, Yunnan, China, improving the efficiency and standardization level of weather analysis and forecasting. The present disclosure can timely and efficiently analyze weather systems correctly, improving the automation level of weather analysis and forecasting, and strengthening the meteorological disaster prevention and mitigation capabilities in Yunnan, Guizhou, and downstream areas of China.

Furthermore, the temperature lapse rate is expressed as follows:

$$\gamma = -\frac{\partial T}{\partial Z} = -\frac{\Delta T}{\Delta Z}$$

where, γ denotes the temperature lapse rate; T denotes an atmospheric temperature; Z denotes an altitude; ∂ denotes a partial derivative operation; ΔT denotes a difference between an upper atmospheric temperature and a lower atmospheric temperature; and ΔZ denotes a difference between an upper geopotential height and a lower geopotential height.

The above further solution has the following beneficial effects. The present disclosure acquires the vertical variation of atmospheric temperature at each point through the above expression, laying the foundation for inversion analysis.

Furthermore, step S3 includes the following sub-steps:
S301: taking γt as a preset threshold in consideration of three types of inversion: weak lapse, strong inversion, and isothermal;
S302: acquiring the initially selected inversion distribution when the maximum inversion trend value is less than or equal to the preset threshold γt, where γt=0.1° C./100 m; and
S303: determining that there is no quasi-stationary front in Kunming, Yunnan, China if there is no inversion at any point in an analysis area, and ending a recognition process.

The above further solution has the following beneficial effects. The present disclosure considers three types of inversion, determines the preset threshold, and effectively determines whether there is an inversion area in the atmosphere based on the preset threshold.

Furthermore, step S4 includes the following sub-steps:
S401: comparing initially selected inversion distributions in the morning and afternoon, and determining whether there are inversion distributions at a same point in the morning and afternoon; if yes, determining that there is a frontal inversion at the point, retaining the point, and setting a frontal inversion label of the point as γ′=1; if not, determining that there is a clear sky radiation inversion at the point, and setting the frontal inversion label of the point as γ′=0; and setting the frontal inversion label of a non-inversion point as γ′=0;
S402: setting the frontal inversion labels of all points as γ′=0 if there is no frontal inversion in the analysis area; and specifically, determining that there is no quasi-stationary front in Kunming, Yunnan, China, and ending the recognition process; and
S403: acquiring, based on a result acquired in step S401, a binary (0, 1) γ′ value distribution map that only retains the frontal inversion.

The above further solution has the following beneficial effects. The present disclosure effectively removes the clear sky radiation inversion and only retains the frontal inversion through the design, thereby acquiring 0, 1 distribution map of the frontal inversion label.

Furthermore, in step S5, the finding a boundary between inversion and non-inversion specifically includes:
extracting, based on the binary (0, 1) γ′ value distribution map, boundary points of 0 and 1 as the candidate frontal points.

The above further solution has the following beneficial effects. The present disclosure acquires the possible boundary point between the cold and warm air of the quasi-stationary front in Kunming, Yunnan, China as the candidate frontal point through the binary (0, 1) γ′ value distribution map.

Furthermore, step S6 includes the following sub-steps:
S601: calculating the east-west distance between each of the candidate frontal points and the overall average position thereof; and
S602: determining whether the east-west distance is greater than a preset east-west distance threshold; if yes, deeming the candidate frontal point as a noise point and removing the candidate frontal point; and if not, retaining the candidate frontal point as a frontal node.

The above further solution has the following beneficial effects. The present disclosure calculates the east-west distance between each of the candidate frontal points and its overall average position, determines whether the east-west distance is greater than the preset east-west distance threshold, and removes possible noise points.

Furthermore, in step S7, the removing meso- and microscale systems specifically includes:
determining whether a distance between north and south top frontal nodes is less than a north-south distance threshold; if yes, determining that there is no quasi-stationary front in Kunming, Yunnan, China, and ending the recognition process; and if not, proceeding to step S8.

The above further solution has the following beneficial effects. The present disclosure removes those other than weather scale systems and retains the true quasi-stationary front in Kunming, Yunnan, China by adjusting the sequence.

Furthermore, in step S8, the one-dimensional Gaussian filtering is expressed as follows:

$$G(x) = \frac{1}{\sqrt{2\pi}\sigma} e^{-\frac{x^2}{2\sigma^2}}$$

where, G (x) denotes a curve acquired after the one-dimensional Gaussian filtering; σ denotes a smoothing parameter; x denotes a data sequence for filtering; and e denotes a natural constant.

The above further solution has the following beneficial effects. The present disclosure performs one-dimensional Gaussian filtering on the longitude data of the frontal nodes and connects the filtered frontal nodes to acquire the quasi-stationary front in Kunming, Yunnan, China.

DETAILED DESCRIPTION OF THE EMBODIMENTS

The specific implementations of the present disclosure are described below to make the present disclosure better understood by those skilled in the art. However, it should be clear that the present disclosure is not limited to the scope of the specific implementations. For those of ordinary skill in the art, changes made within the spirit and scope of the present disclosure defined by the appended claims are apparent, and all innovations and creations made based on the concept of the present disclosure fall within the protection scope of the present disclosure.

Embodiment

The troposphere is the lowest layer of the Earth's atmosphere, with a height ranging from several kilometers to over ten kilometers. In the troposphere, the meteorological elements change dramatically, and almost all weather phenomena such as wind, frost, rain, and snow occur in this layer. In general, the temperature in the lower troposphere is higher while the temperature in the upper atmosphere is lower, and the vertical distribution of atmospheric temperature is warmer below and colder above. In order to represent the variation of atmospheric temperature with altitude, the concept of temperature lapse rate is introduced.

The temperature lapse rate denotes the rate γ of vertical variation of atmospheric temperature:

$$\gamma = -\frac{\partial T}{\partial Z} \tag{1}$$

where, T denotes an atmospheric temperature; Z denotes an altitude; and ∂ denotes a partial derivative operation.

Due to the negative sign in Eq. (1), γ is positive when the normal atmospheric temperature decreases with altitude. Under standard circumstances, the temperature lapse rate in the troposphere is 0.65° C./100 m, which means that for every 1 km increase in altitude, the atmospheric temperature decreases by 6.5° C. However, the atmospheric changes in the troposphere are severe, and the vertical variation of atmospheric temperature is very complex. In some cases, the atmospheric temperature increases with altitude. The phenomenon of atmospheric temperature increasing with altitude is called inversion, and the value of γ is negative.

This embodiment involves frontal inversion and clear sky radiation inversion. Generally, the vertical distribution of atmospheric temperature means that the higher the altitude, the lower the atmospheric temperature. However, this is not the case for the frontal zone. In case a front occurs, the cold air mass is located upon the lower part of the front, while the warm air mass is located in the upper part of the front. When the lower cold air pushes into the upper warm air from the bottom, the atmospheric temperature increases with altitude, which is called a frontal inversion. Due to the different intensities of cold and warm air, the vertical distribution of frontal temperature generally exhibits three states: isothermal, weak lapse, and inversion, collectively referred to as frontal inversion.

Figure 1:
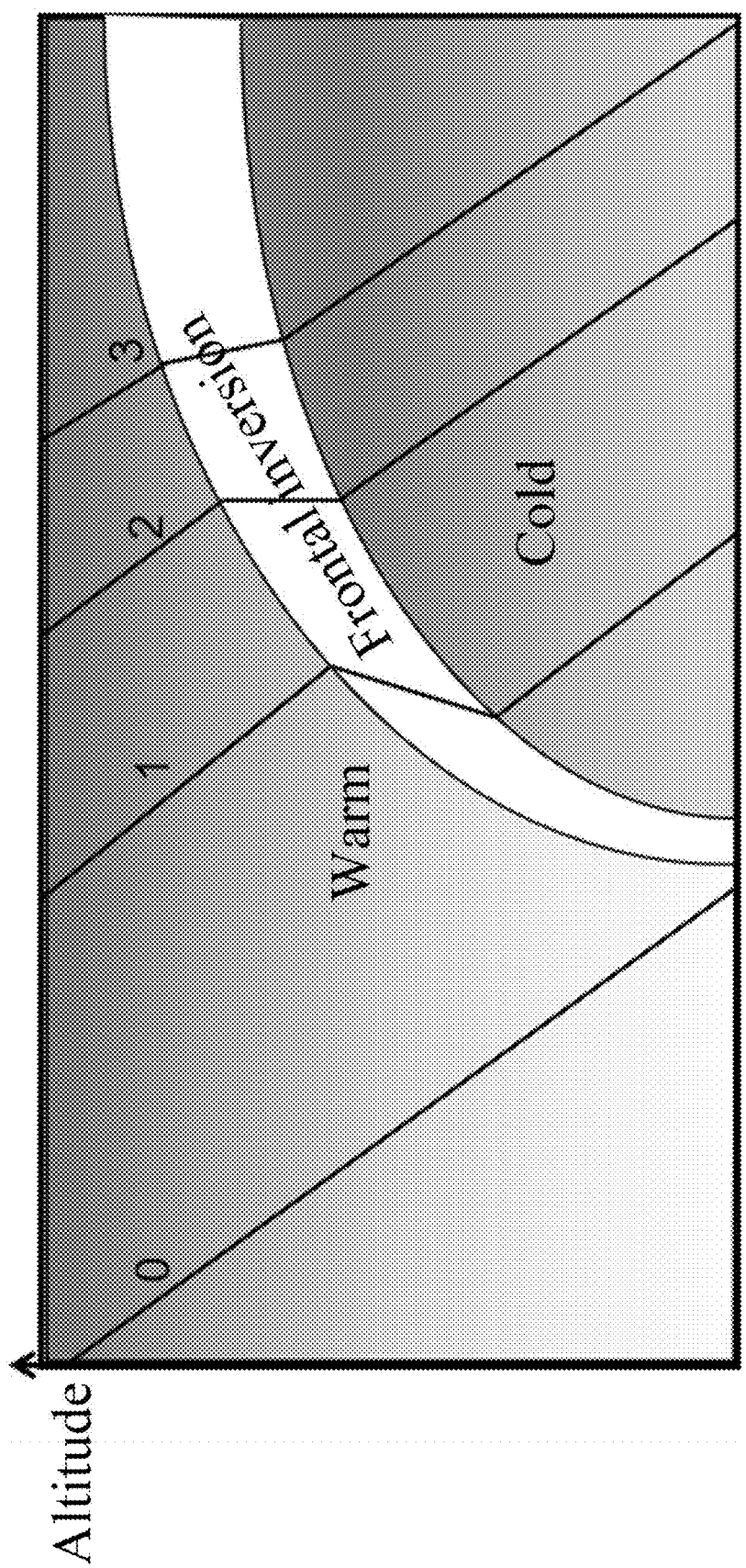
FIG. 1 is a schematic diagram of a vertical temperature variation near a front according to an embodiment of the present disclosure.

In this embodiment, FIG. 1 shows three different frontal inversion states and the normal variation of atmospheric temperature with altitude. In the figure, the y axis denotes altitude, the bright color in the lower part denotes high atmospheric temperature, the dark color in the upper part denotes low atmospheric temperature, and the frontal inversion occurs is in the middle layer. Bend lines 0 to 3 represent the variation of atmospheric temperature with altitude. The bend line 0 indicates that in the warm air before the front, the normal atmospheric temperature decreases with altitude. The bend lines 1 to 3 represent the situations in the cold air area behind the front. The bend line 1 is located close to the front, where the strong cold air in the lower part pushes violently against the strong warm air in the upper part. Here, the sounding balloon shows a normal decrease in atmospheric temperature as it rises in cold air. However, when the sounding balloon enters the upper layer of strong warm air through the front, it shows that the atmospheric temperature does not decrease but instead rises, resulting in a strong inversion. The bend line 2 is located in a middle zone of the cold air behind the front, where the temperature of the warm air in the upper part is equal to that of the cold air in the lower part. Here, when the sounding balloon rises, it shows that the atmospheric temperature does not change with altitude but remains isothermal. The bend line 3 is located further behind the front. Here, the front is relatively weak, with both warm and cold air exhibiting variability, and the contrast between the warm and cold air is weakened, resulting in a relatively weak front intensity. The sounding results often indicate that the atmospheric temperature decreases slightly with altitude, with the temperature lapse rate much lower than the normal temperature lapse rate. Therefore, the above three types of frontal inversion will occur in the cold air area behind the front.

Therefore, the vertical distribution of atmospheric temperature on the cold air side behind the front is different from the vertical distribution of normal atmospheric temperature, resulting in a frontal inversion. Specifically, for a quasi-stationary front in Kunming, Yunnan, China, the warm air mass is located in front of the front (west side) and the cold air mass is located behind the front (east side). The inversion occurs in areas controlled by the cold air mass behind the front and near the ground surface. The areas before the front are controlled by the warm air mass from the ground surface to the upper atmosphere, and the temperature lapse rate is normal, so there is no frontal inversion.

In this embodiment, due to the occurrence of the inversion behind the front and no inversion before the front, whether there is a frontal inversion can be automatically determined based on the temperature lapse rate so as to determine whether there is a front. However, before the recognition begins, it is necessary to remove the influence of clear sky radiation inversion.

The specific heat capacity of different substances varies greatly. Under the same thermal background, substances with higher specific heat capacity have smaller temperature changes, while substances with lower specific heat capacity have greater temperature changes. The specific heat capacity of the atmosphere is much higher than that of the ground surface, so under the same heat transfer, the change in ground surface temperature is much greater than the change in atmospheric temperature, which is equivalent to water with a large specific heat capacity and iron with a small specific heat capacity. When the sun starts to shine in the morning, the ground surface temperature rises much higher than the atmospheric temperature. When iron is exposed to sunlight under clear sky, its temperature rapidly rises to a very high temperature. However, when water of the same mass is exposed to sunlight, its temperature rises slowly and in a limited manner. After nightfall, the ground surface experiences rapid and intense radiative cooling, while the magnitude and speed of atmospheric radiative cooling are much smaller. In the near ground surface layer, the atmospheric temperature reaches a very low value, while in the upper atmosphere, the decrease in the atmospheric temperature is not significant, resulting in cold lower atmosphere and warm upper atmosphere.

In this case, a clear sky radiation inversion will occur. Generally, the maximum radiation inversion occurs in the clear sky around 8 am when the sun rises in the morning. Why do we have to talk about clear skies? The answer is that the heat dissipates outward from the atmosphere and the ground surface only under clear skies. If there are clouds in the sky, especially dense low clouds over the ground surface layer, the clouds will act like a quilt to prevent the heat from dissipating outward from the atmosphere and the ground surface, causing minimal temperature changes and thus not forming a clear sky radiation inversion.

For a quasi-stationary front in Kunming, Yunnan, China, there is a large, clear and dry area in the warm air on the west side of the front, which is the best condition for a nighttime clear sky radiation inversion. On the east side behind the front, there is continuous rain and no clear sky inversion. In the morning, the clear sky radiation inversion will mix with the frontal inversion, affecting the automatic recognition of the front, so it must be removed.

The clear sky radiation inversion has strong temporal fluctuations. When the clear sky radiation inversion is maximum, that is, before and after sunrise, the ground surface temperature drops to the lowest point. After the sun rises, the ground surface gradually heats up and the heating rate of the ground surface is much faster than that of the upper atmosphere. The clear sky radiation inversion gradually weakens and disappears, and the atmosphere returns to the normal state of temperature decreasing with altitude.

The clear sky radiation inversion is strong in the morning when the temperature is low, and disappears when the temperature rises during the day. Therefore, the interference of clear sky radiation inversion can be removed by comparing the changes in clear sky radiation inversion in the afternoon and morning.

Figure 3:
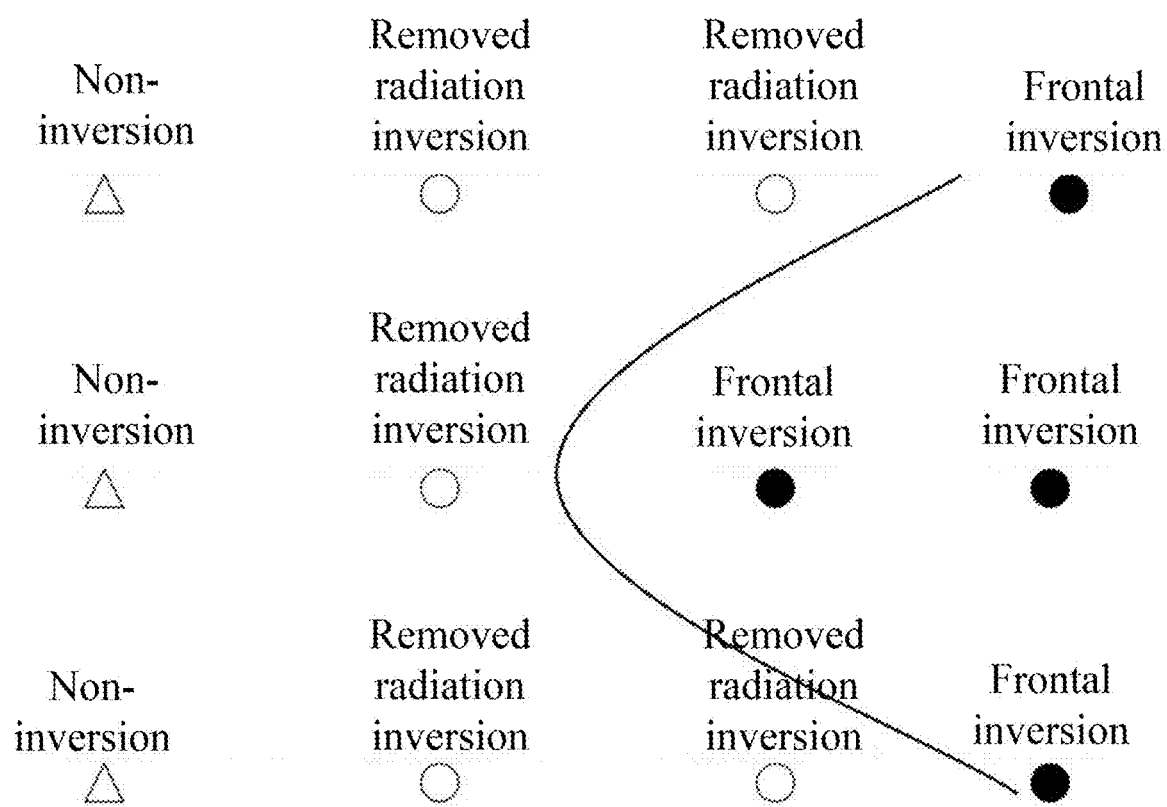
FIG. 3 is a schematic diagram showing the horizontal distribution of a quasi-stationary front in Kunming, Yunnan, China reflected by a frontal inversion according to the embodiment of the present disclosure.

The distribution of inversion in the morning and night in the area where a quasi-stationary front in Kunming, Yunnan, China occurs is shown in FIG. 3. In the figure, except for the frontal inversion and non-inversion areas, many areas have clear sky radiation inversions at night. In the figure, the triangle denotes no inversion, the hollow circle denotes clear sky radiation inversion, and the solid circle denotes frontal inversion. The clear sky radiation inversion greatly affects the accurate recognition of the quasi-stationary front in Kunming, Yunnan, China, so it needs to be removed.

In this embodiment, in order to recognize the three types of inversion, namely pure upward inversion, isothermal, and weak lapse, a discrimination threshold needs to be set. The normal temperature lapse rate is 0.65° C./100 m. Multiple experiments have found that when the temperature lapse rate is less than or equal to 0.1° C./100 m, the inversion can be maximally retained to avoid missing possible frontal points and prevent mixing with non-inversion points. Therefore, the threshold for the temperature lapse rate is determined to be $\gamma t = 0.1°$ C./100 m.

Figure 2:
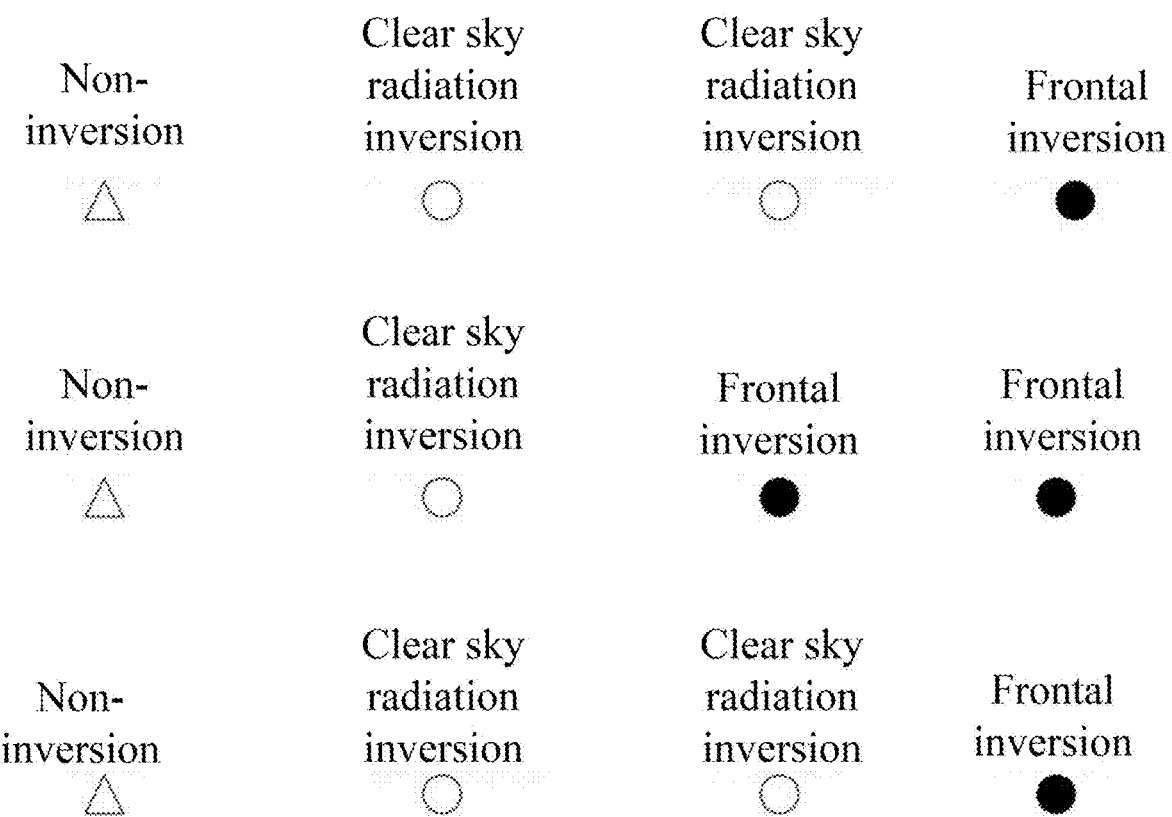
FIG. 2 is a schematic diagram showing the horizontal distribution of a temperature lapse rate in the morning or at night according to the embodiment of present disclosure.

By discriminating the temperature lapse rate $\gamma$ at each point, when $\gamma \leq \gamma t$ at a certain point, it can be determined that there is an inversion at that point, as shown in FIG. 2. However, the clear sky radiation inversion generated at night will be mixed in the morning, so it should be removed.

In this embodiment, since the clear sky radiation inversion can dissipate at noon, the clear sky radiation inversion can be removed while retaining the frontal inversion by comparing the differences in the inversion in the morning and at noon. The front line position of the quasi-stationary front in Kunming, Yunnan, China is located between the frontal inversion point and the non-inversion point, as shown in FIG. 3. In the figure, the line segment denotes the quasi-stationary front in Kunming, Yunnan, China, the triangle denotes no inversion, the hollow circle denotes the radiation inversion removed after discrimination, and the solid circle denotes the frontal inversion.

In this embodiment, the quasi-stationary front in Kunming, Yunnan, China can be recognized through inversion features.

In this embodiment, the height reflects the concept of altitude. In addition, if gravity is taken into account for work, it also reflects the potential energy of the atmosphere. Therefore, in meteorology, the height of each point is not based on the general geometric altitude or altitude, but on the geopotential height, which denotes the energy generated by gravity when atmospheric masses fall from a certain altitude to sea level.

The higher the atmosphere is above the ground surface, the thinner the air and the lower the atmospheric pressure. Therefore, the altitude of the atmosphere can be represented by atmospheric pressure, and the higher the altitude, the lower the atmospheric pressure. The detection, analysis, and calculation of the atmospheric sciences often use atmospheric pressure in the vertical direction to represent the vertical position. Previous studies have shown that the maximum altitude of a quasi-stationary front in Kunming, Yunnan, China is generally around 700 hPa, so each point is calculated from the ground surface to 650 hPa to avoid omissions and acquire the temperature lapse rate between the layers.

Figure 4:
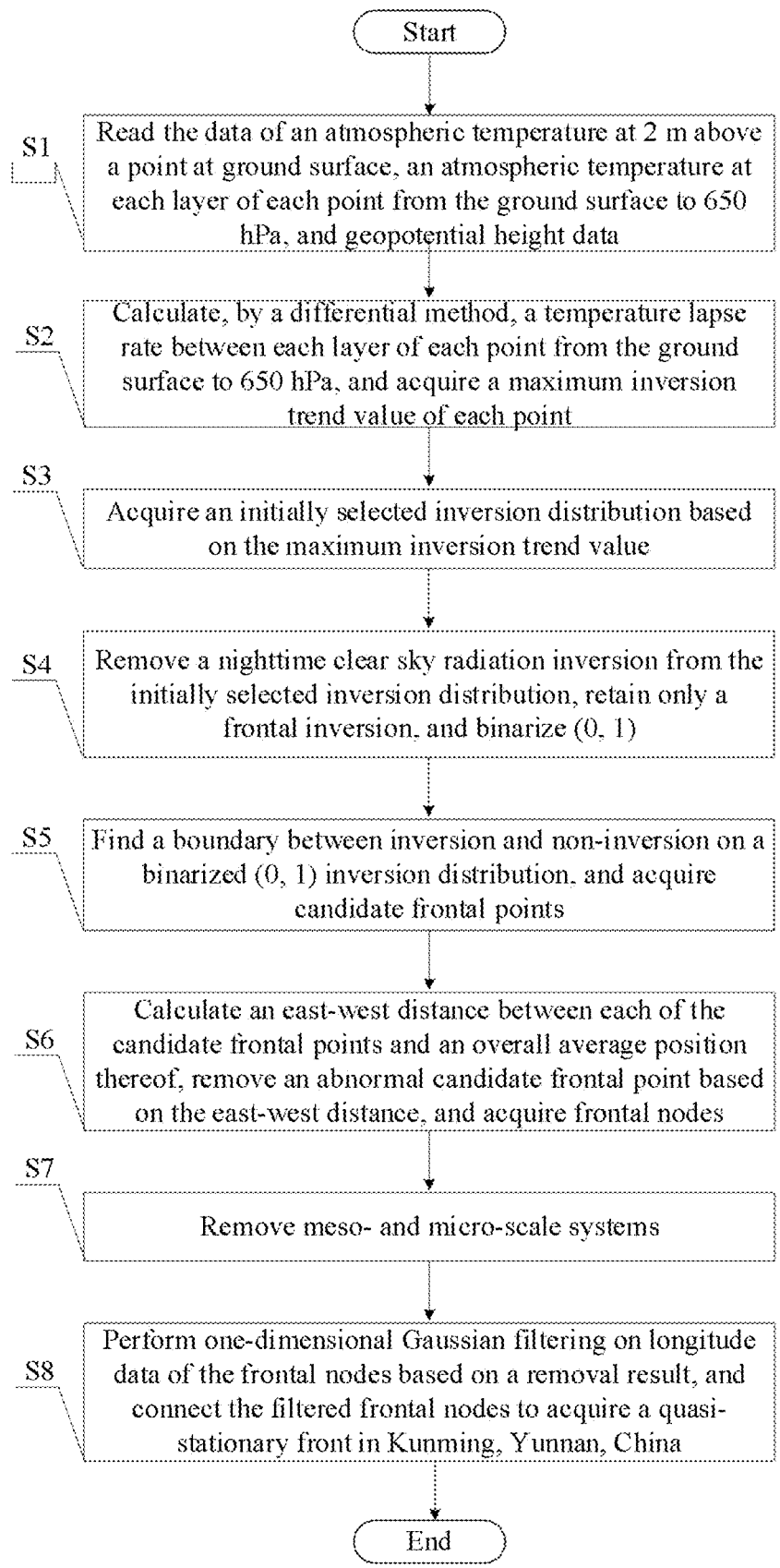
FIG. 4 is a flowchart of an automatic recognition method for a dry quasi-stationary front in Kunming, Yunnan, China according to the present disclosure.

As shown in FIG. 4, the present disclosure provides an automatic recognition method for a dry quasi-stationary front in Kunming, Yunnan, China, including the following steps.

S1. The data of an atmospheric temperature at 2 m above a point at ground surface, an atmospheric temperature at each layer of each point from the ground surface to 650 hPa, and geopotential height data are read.

S2. A temperature lapse rate between each layer of each point from the ground surface to 650 hPa is calculated by a differential method, and a maximum inversion trend value of each point is acquired.

In this embodiment, there is often no ideal analytical expression in practical work, and differential calculations are generally performed on discretized data through differential methods. The differential calculation equation for the temperature lapse rate is as follows:

$$\gamma = -\frac{\partial T}{\partial Z} = -\frac{\Delta T}{\Delta Z} \quad (2)$$

where, $\gamma$ denotes the temperature lapse rate; T denotes an atmospheric temperature; Z denotes an altitude; $\partial$ denotes a partial derivative operation; $\Delta T$ denotes a difference between an upper atmospheric temperature and a lower atmospheric temperature; and $\Delta Z$ denotes a difference between an upper geopotential height and a lower geopotential height.

In this embodiment, step S2 is implemented as follows.

According to the activity range of the quasi-stationary front in Kunming, Yunnan, China, the recognition area is determined as one between 23.5° N and 30° N and between 100° E and 110° E.

Firstly, at each point, the temperature lapse rate of each layer from the ground surface to 650 hPa is calculated according to Eq. (2), which refers to a ratio of the difference between the upper atmospheric temperature and the lower atmospheric temperature to the difference between the upper geopotential height and the lower geopotential height. If the difference in the geopotential height of the isobaric surface between the ground surface and an upper layer is less than 100 m, considering the strong disturbance caused by the large gradient in the ground surface layer, the temperature lapse rate of the upper layer other than the ground surface will be calculated.

Figure 5:
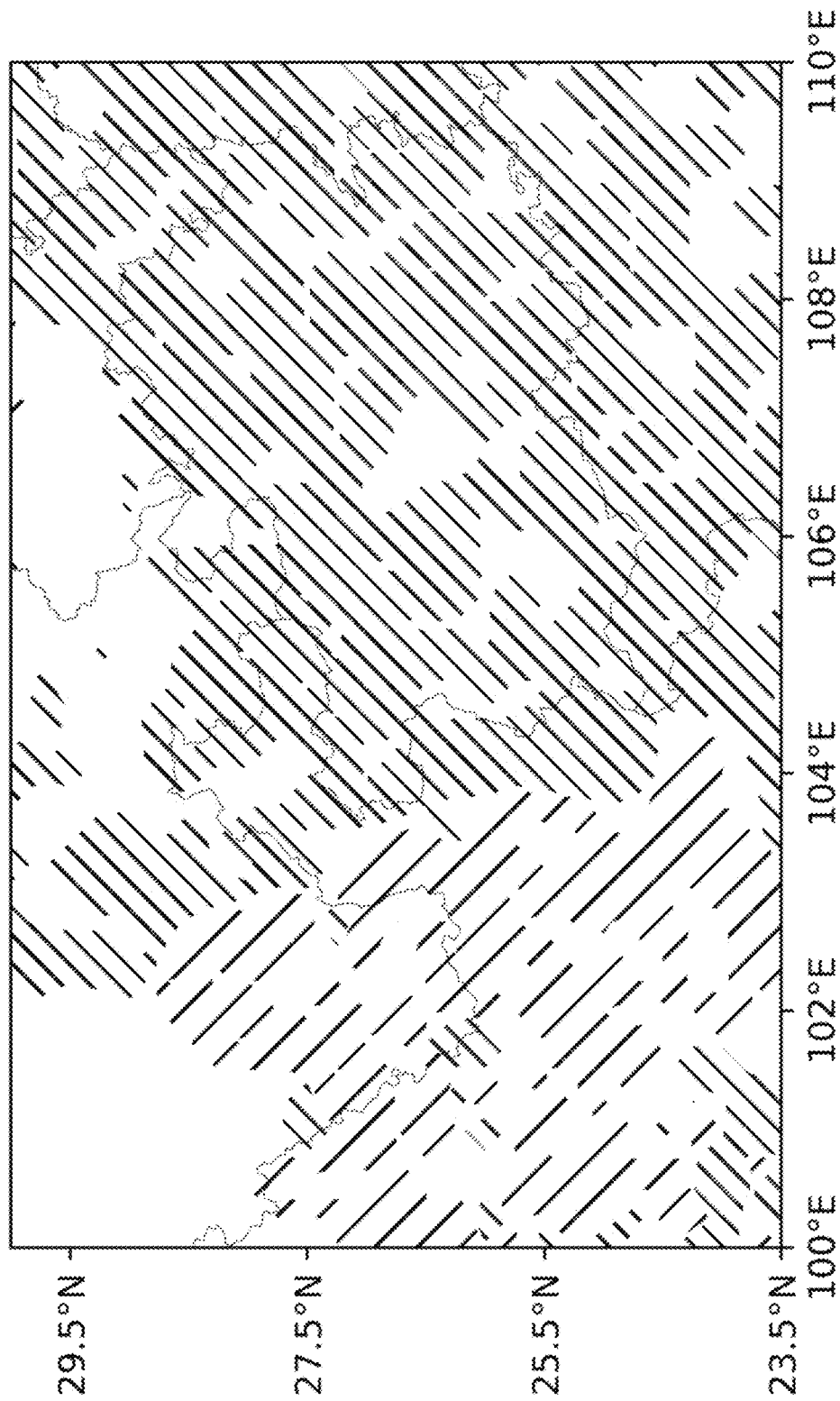
FIG. 5 is a schematic diagram of a maximum inversion trend distribution according to the embodiment of the present disclosure.

Then, the minimum temperature lapse rate of each point is output, which reflects the maximum inversion trend above that point, as shown in FIG. 5. In the figure, the y axis denotes latitude; the x axis denotes longitude; / denotes negative temperature lapse rate, indicating a strong inversion with altitude; and \ denotes positive temperature lapse rate, indicating decrease of temperature with altitude. If the temperature lapse rate in the area is less than a certain threshold, an inversion occurs.

S3. An initially selected inversion distribution is acquired based on the maximum inversion trend value. Specifically:

S301. $\gamma t$ is taken as a preset threshold in consideration of three types of inversion: weak lapse, strong inversion, and isothermal.

S302. The initially selected inversion distribution is acquired when the maximum inversion trend value is less than or equal to the preset threshold $\gamma t$, where $\gamma t=0.1°$ C./100 m.

S303. It is determined that there is no quasi-stationary front in Kunming, Yunnan, China if there is no inversion at any point in an analysis area, and a recognition process is ended.

In this embodiment, FIG. 5 reflects the minimum temperature lapse rate, i.e. the maximum inversion trend, but it only reflects the positive or negative temperature lapse rate. If the positive temperature lapse rate is less than a certain threshold, an inversion occurs. The normal temperature lapse rate is 0.65° C./100 m. Considering the three types of inversion: weak lapse, strong inversion, and isothermal, the setting of the discrimination condition should avoid omissions and prevent mixing with non-inversion. Through repeated experiments, the preset threshold is set as $\gamma t=0.1°$ C./100 m.

When $\gamma$ is less than or equal to $\gamma t$, it is determined that inversion occurs and the initially selected inversion distribution is acquired.

It is determined that there is no quasi-stationary front in Kunming, Yunnan, China if there is no inversion at any point in an analysis area, and the analysis process is ended.

Figure 6:
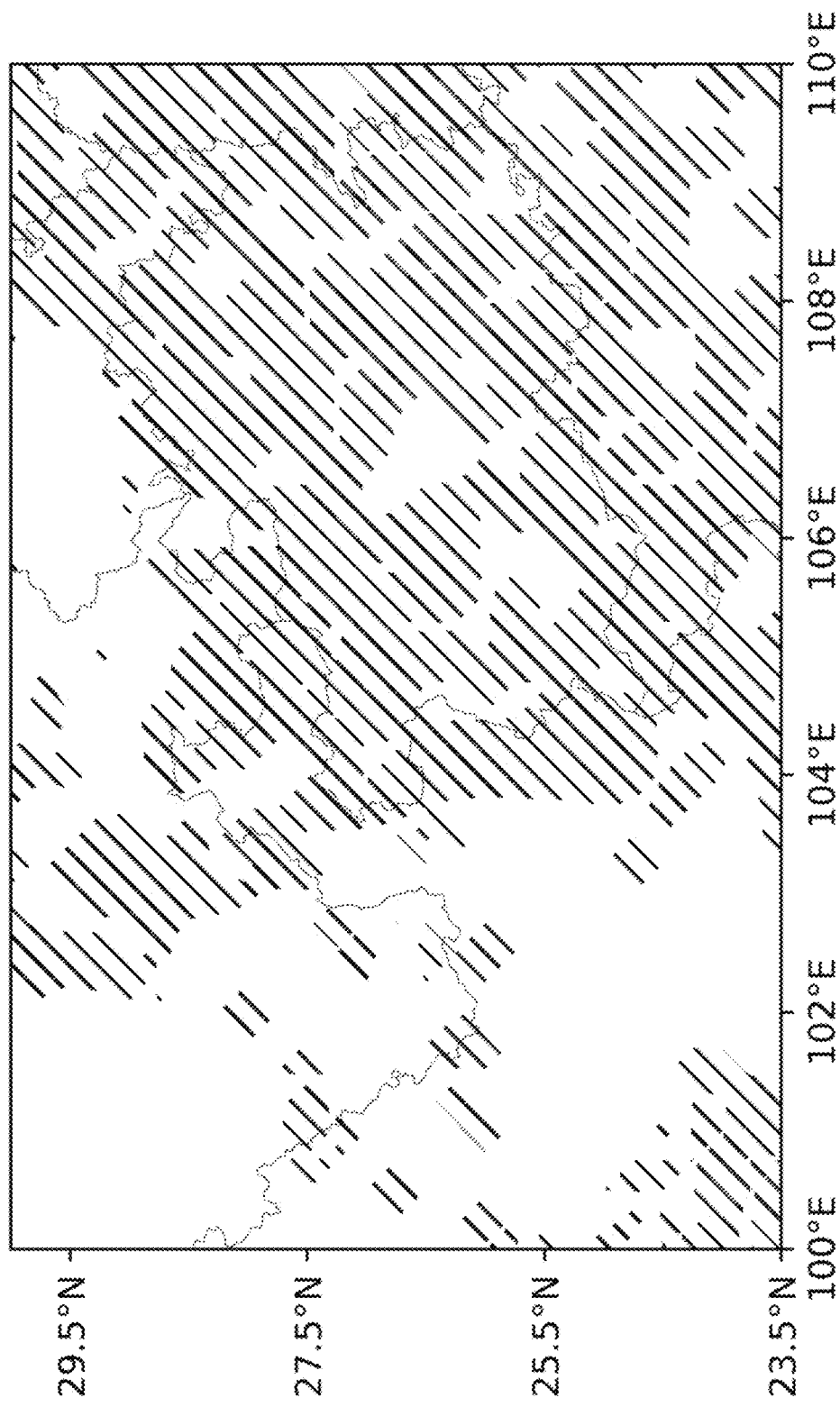
FIG. 6 is a schematic diagram of an initially selected inversion result satisfying a threshold according to an embodiment of the present disclosure.

In this embodiment, the initially selected inversion distribution is shown in FIG. 6. In the figure, the y axis denotes latitude; the x axis denotes longitude; and/denotes the area of the initially selected inversion distribution that meets the threshold.

In this embodiment, it is necessary to remove the clear sky radiation inversion and binarize (0, 1) the frontal inversion. The initially selected result includes frontal inversion and clear sky radiation inversion. At clear nights, the difference in the radiative abilities between the ground surface and the atmosphere causes a clear sky radiation inversion featuring a warm upper part and a cold lower part. This inversion is not a frontal feature and its impact needs to be removed. Considering that the clear sky radiation inversion weakens in the afternoon, it is only necessary to compare the initially selected inversion distributions in the morning and at noon.

S4. Based on the initially selected inversion distribution, a nighttime clear sky radiation inversion is removed and only a frontal inversion is retained, and binarization (0, 1) is performed. Specifically:

S401. Initially selected inversion distributions in the morning and afternoon are compared, and it is determined whether there are inversion distributions at a same point in the morning and afternoon. If yes, it is determined that there is a frontal inversion at the point, the point is retained, and a frontal inversion label of the point is set as $\gamma'=1$. If not, it is determined that there is a clear sky radiation inversion at the point, and the frontal inversion label of the point is set as $\gamma'=0$. The frontal inversion label of a non-inversion point is set as $\gamma'=0$;

S402. The frontal inversion labels of all points are set as $\gamma'=0$ if there is no frontal inversion in the analysis area. Specifically, it is determined that there is no quasi-stationary front in Kunming, Yunnan, China, and the recognition process is ended.

S403. A binary (0, 1) $\gamma'$ value distribution map that only retains the frontal inversion is acquired based on a result acquired in step S401.

Figure 7:
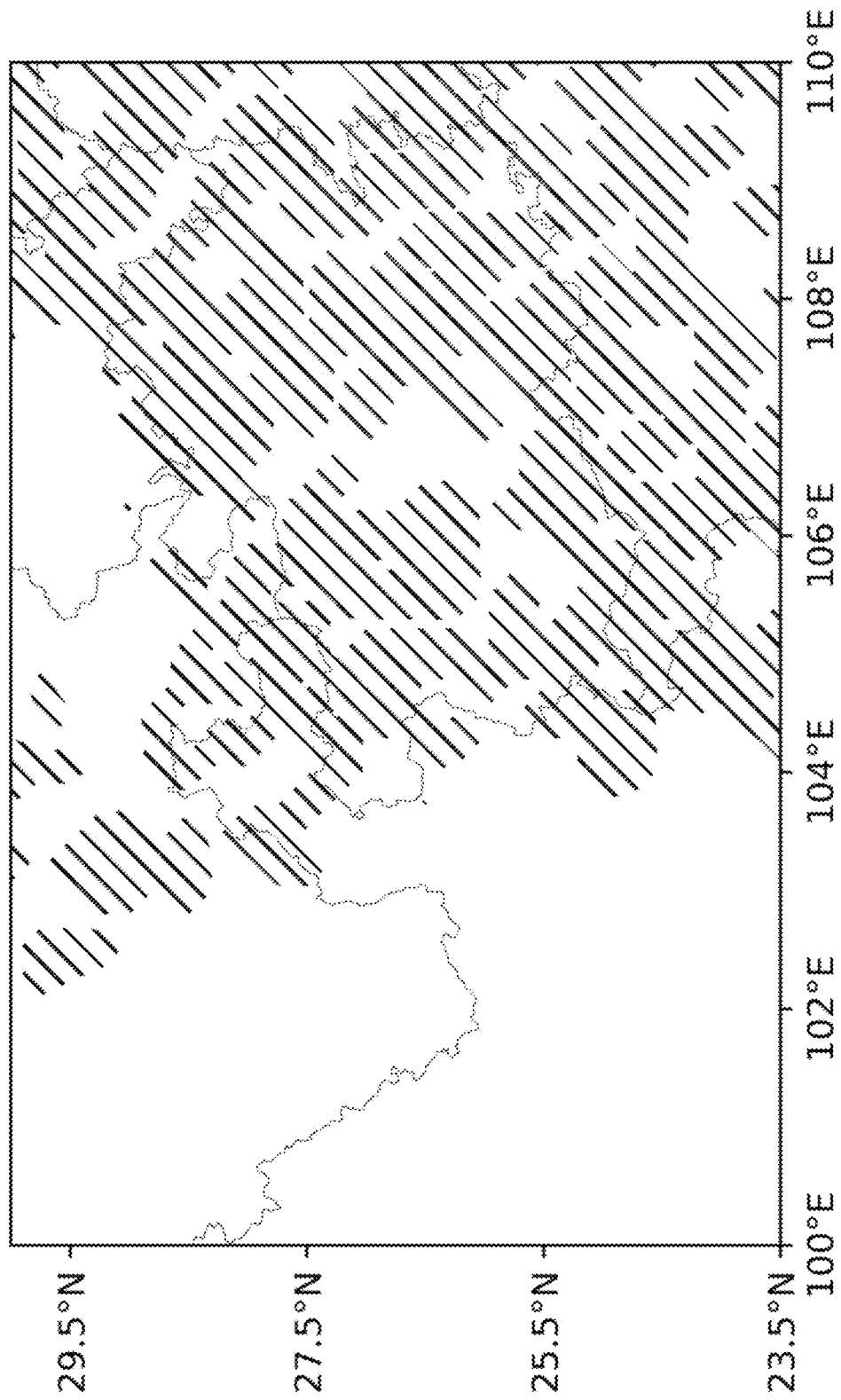
FIG. 7 is a schematic diagram of a frontal inversion distribution without a clear sky inversion according to the embodiment of the present disclosure.

As shown in FIG. 7, the y axis denotes latitude, the x axis denotes longitude, and/denotes the frontal inversion distribution.

S5. A boundary between inversion and non-inversion is found on a binarized (0, 1) inversion distribution, and candidate frontal points are acquired. Specifically:

Based on the binary (0, 1) $\gamma'$ value distribution map, a boundary point of 0 and 1 is extracted as a candidate frontal point, that is, a possible location of the quasi-stationary front in Kunming, Yunnan, China.

Figure 8:
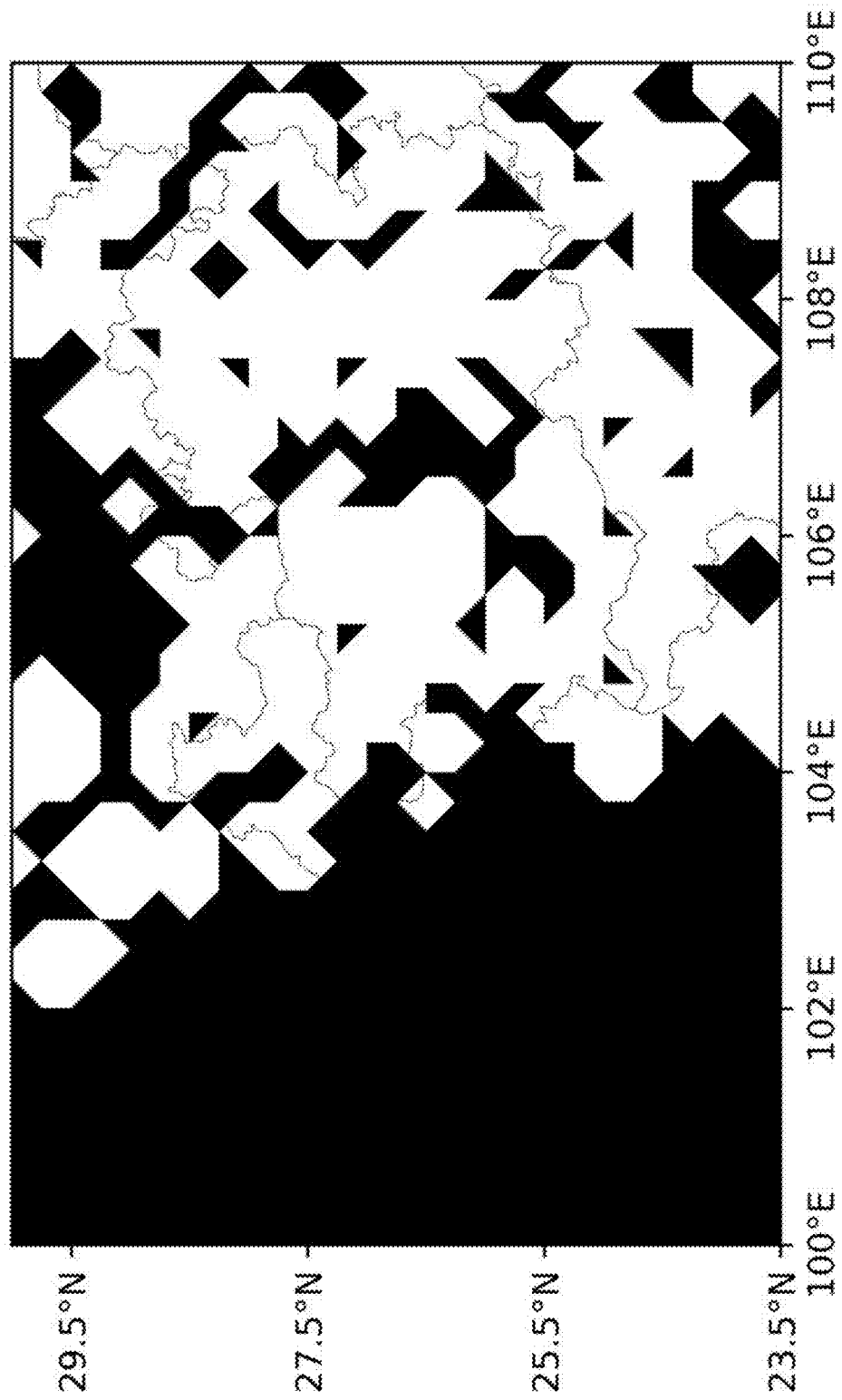
FIG. 8 is a schematic diagram of a binarized (0, 1) frontal inversion label γ' according to the embodiment of the present disclosure.

In this embodiment, for the binary (0, 1) frontal inversion label $\gamma'$ distribution map, the boundary point of 0 and 1 is extracted as the candidate frontal point, which is the possible location of the quasi-stationary front in Kunming, Yunnan, China. As shown in FIG. 8, $\gamma'=0$ shows the black area, and $\gamma'=1$ shows the white area. In the figure, the y axis denotes latitude, and the x axis denotes longitude.

Figure 9:
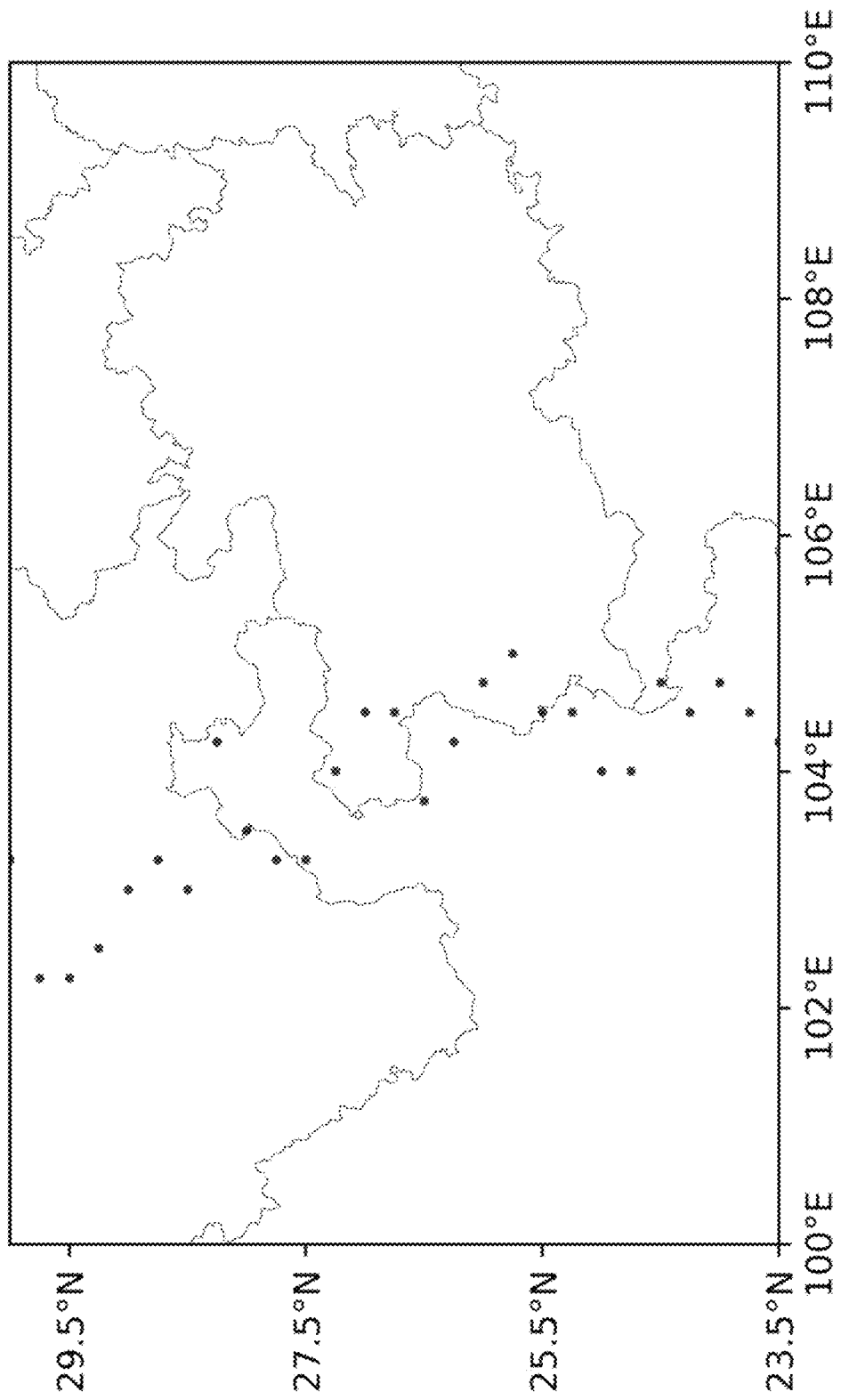
FIG. 9 is a schematic diagram of extracted candidate frontal points according to the embodiment of the present disclosure.

From west to east, a first point with the frontal inversion label $\gamma'=1$ serves as a westernmost boundary point or as the candidate frontal point, as shown in FIG. 9. In the figure, the y axis denotes latitude, and the x axis denotes longitude.

S6. An east-west distance between each of the candidate frontal points and an overall average position thereof is calculated, the abnormal candidate frontal points are removed based on the east-west distance, and frontal nodes are acquired. Specifically:

S601. The east-west distance between each of the candidate frontal points and the overall average position thereof is calculated.

S602. It is determined whether the east-west distance is greater than a preset east-west distance threshold. If yes, the candidate frontal point is deemed as a noise point and this candidate frontal point is removed. If not, the candidate frontal point is retained as a frontal node.

In this embodiment, the quasi-stationary front in Kunming, Yunnan, China is generally distributed in a north-south direction, so the positions of each point on the front are relatively concentrated in the east-west direction. But there are a few points that deviate far in the east-west direction and should be removed.

In this embodiment, the east-west difference between each candidate frontal point and its average position is calculated, i.e. lon[i]–lon$_{avg}$. If the east-west difference of a certain point is greater than the east-west distance threshold Da, the point is considered as a noise point and removed from the sequence of the candidate frontal points. According to the analysis of the characteristics of the quasi-stationary front in Kunming, Yunnan, China, the east-west distance threshold is Da=200 km, which means that the east-west difference is 2° longitudes greater than the average value. The removal criterion is as follows:

$$lon[i]-lon_{avg}>Da \qquad (3)$$

where, lon[i] denotes the longitude of the currently detected candidate frontal point;

$$lon_{avg} = \frac{1}{n}\sum lon[i]$$

denotes the average longitude of each candidate frontal point; and n denotes the total number of the candidate frontal points.

The candidate frontal points after noise elimination form the frontal nodes.

S7. Meso- and micro-scale systems are removed. Specifically:

It is determined whether a distance between north and south top frontal nodes is less than a north-south distance threshold. If yes, it is determined that there is no quasi-stationary front in Kunming, Yunnan, China, and the recognition process is ended. If not, the operation proceeds to step S8.

In this embodiment, due to the fact that quasi-stationary front in Kunming, Yunnan, China is a weather scale system with a horizontal range of thousands of kilometers, its length should generally be greater than 300 km or greater than 3° latitudes, otherwise it will be removed. Therefore, the threshold for the north-south distance is Db=300 km. The frontal length is calculated based on the frontal nodes at the north and south ends:

$$LatN-LatS<Db \qquad (4)$$

where, LatN denotes a northernmost frontal node, and LatS denotes a southernmost frontal node.

If Eq. (4) is satisfied, it is determined that the scale is too small and there is no quasi-stationary front in Kunming, Yunnan, China, and the analysis process is finished. Otherwise, the analysis process proceeds to step S8.

S8. One-dimensional Gaussian filtering is performed on longitude data of the frontal nodes based on a removal result, and the filtered frontal nodes are connected to acquire a quasi-stationary front in Kunming, Yunnan, China.

In this embodiment, Gaussian filtering is a smoothing filtering method suitable for eliminating Gaussian noise. When filtering, the value of each point is acquired by weighted averaging its own value and the values of other points in the neighborhood. In the present disclosure, a curve is formed by smoothing the longitude of the frontal node:

$$G(x) = \frac{1}{\sqrt{2\pi}\sigma}e^{-\frac{x^2}{2\sigma^2}} \qquad (5)$$

where, G(x) denotes a curve acquired after the one-dimensional Gaussian filtering; $\sigma$ denotes a smoothing parameter; x denotes a data sequence for filtering; and e denotes a natural constant.

In this embodiment, one-dimensional Gaussian filtering is applied to the longitude data of the frontal nodes, and the filtered nodes are connected to form the quasi-stationary front in Kunming, Yunnan, China, thereby determining the position of the quasi-stationary front in Kunming, Yunnan, China.

Figure 10A:
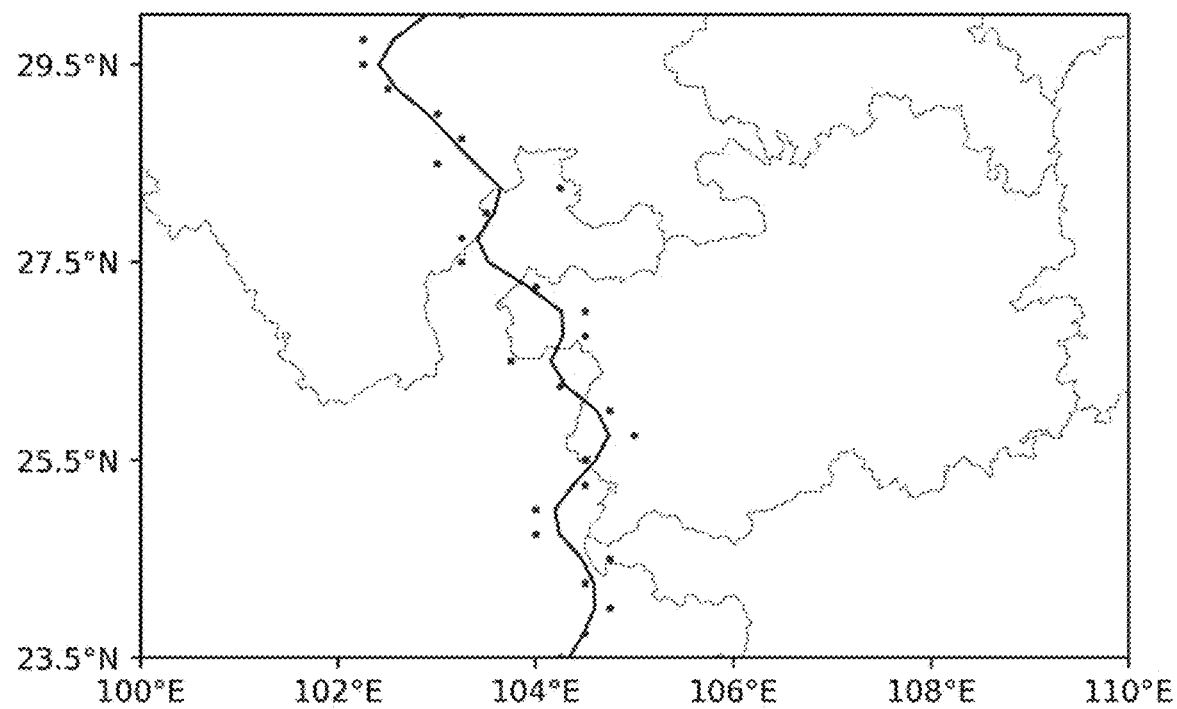
FIGS. 10A-10D show a filtering result of the quasi-stationary front in Kunming, Yunnan, China according to the embodiment of the present disclosure.
Figure 10B:
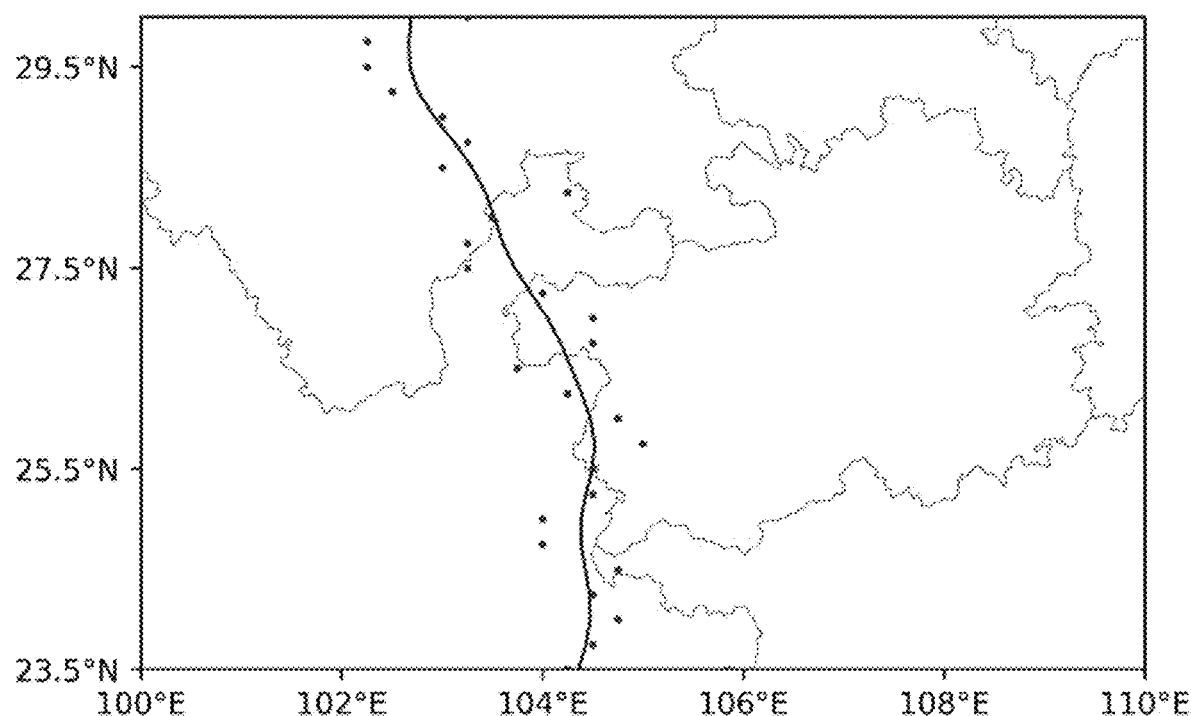
Figure 10C:
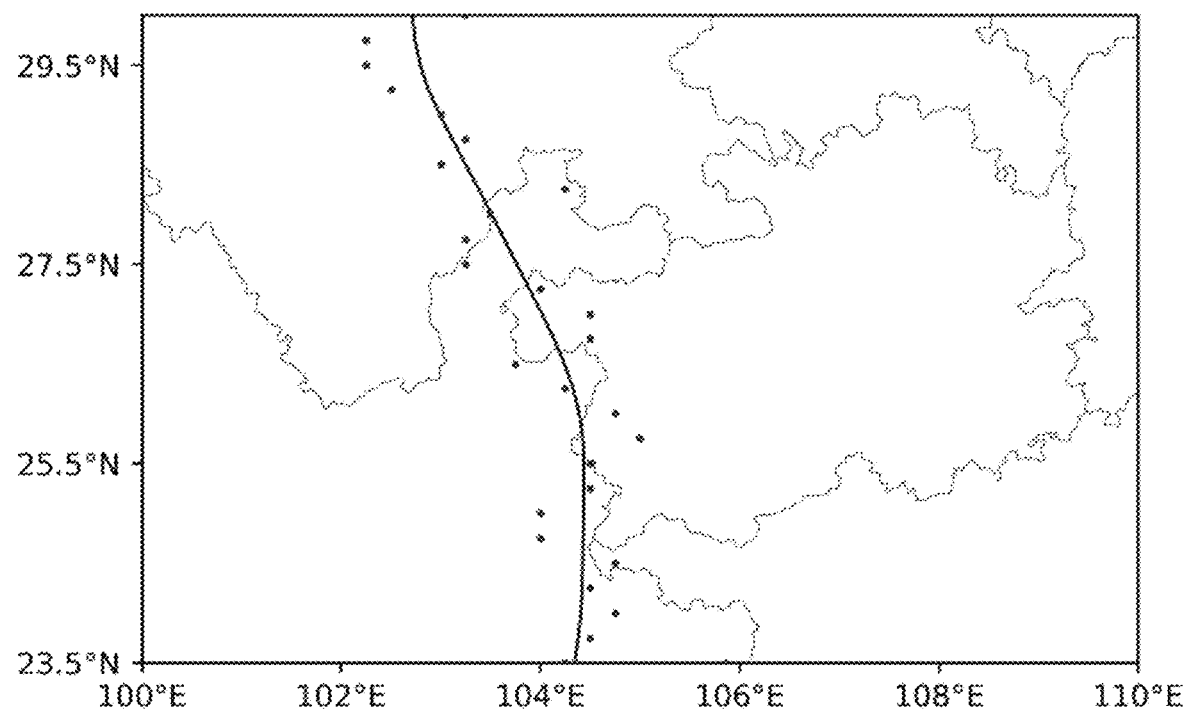
Figure 10D:
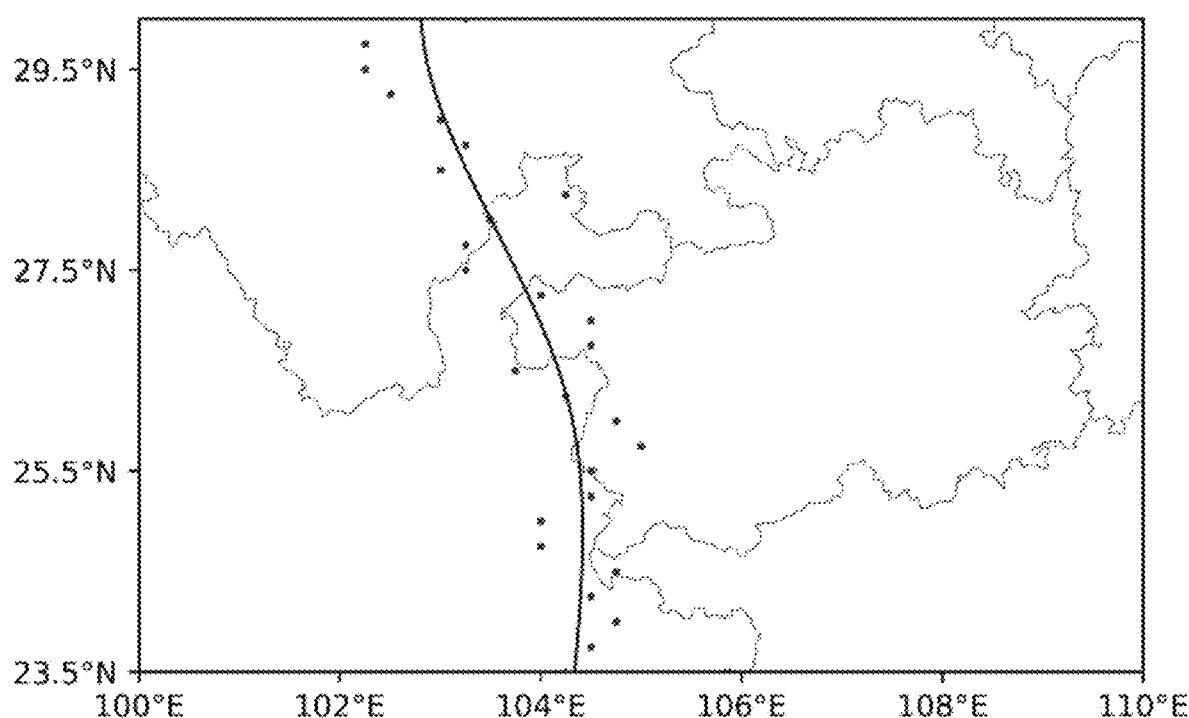

Comparative experiments have shown that when $\sigma=4$, Eq. (5) reflects a better filtering effect and runs faster. After applying one-dimensional Gaussian filtering to the longitude data of the frontal nodes according to Eq. (5), the quasi-stationary front in Kunming, Yunnan, China is determined. It is plotted, and coordinate parameters are output. As shown in FIGS. 10A-10D, the y axis denotes latitude and the x axis denotes longitude. In FIG. 10A, $\sigma=1$; in FIG. 10B, $\sigma=2$; in FIG. 10C, $\sigma=3$; and in FIG. 10D, $\sigma=4$.

Figure 11:
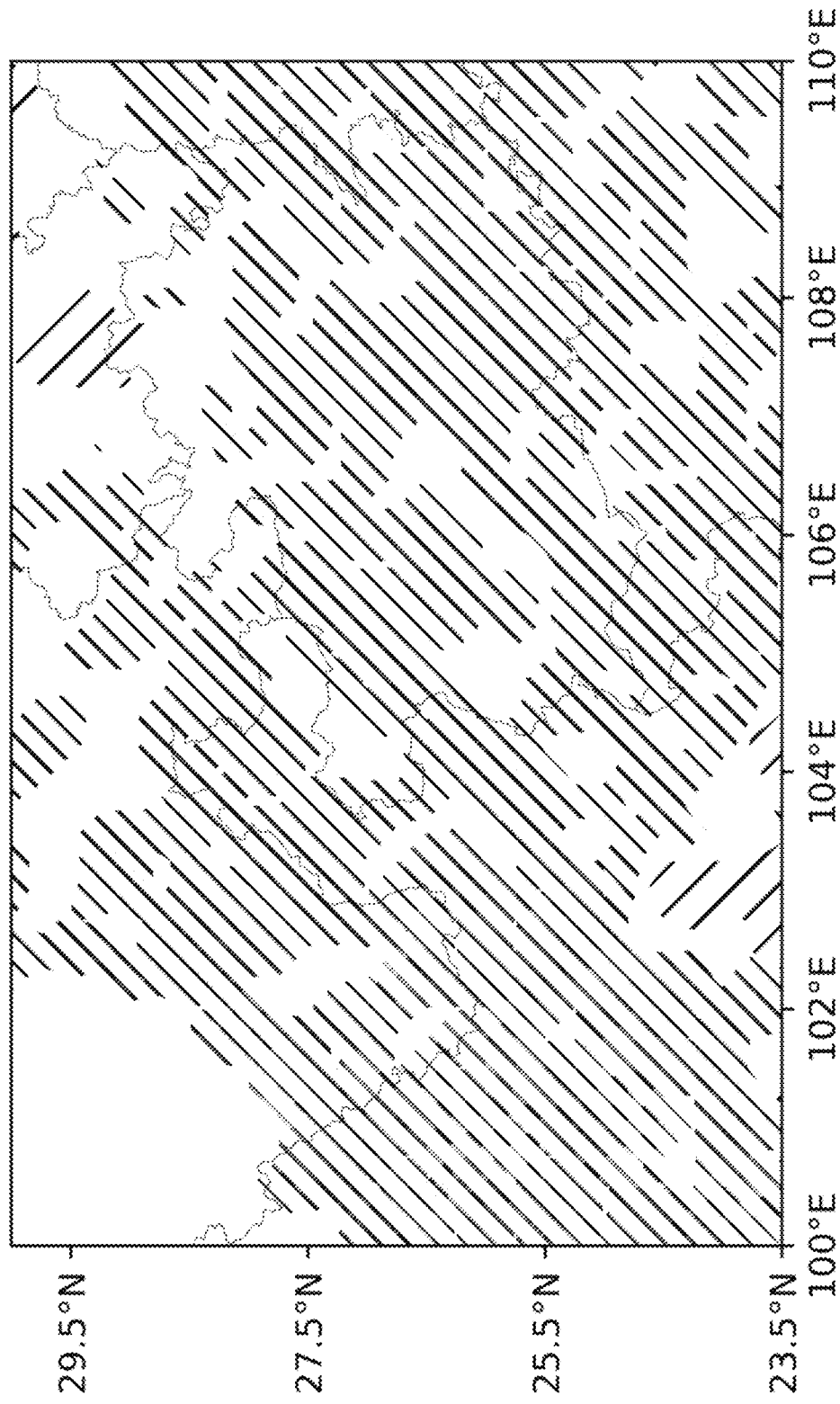
FIG. 11 is a schematic diagram of a maximum inversion trend distribution of each point according to a case of the present disclosure.
Figure 12:
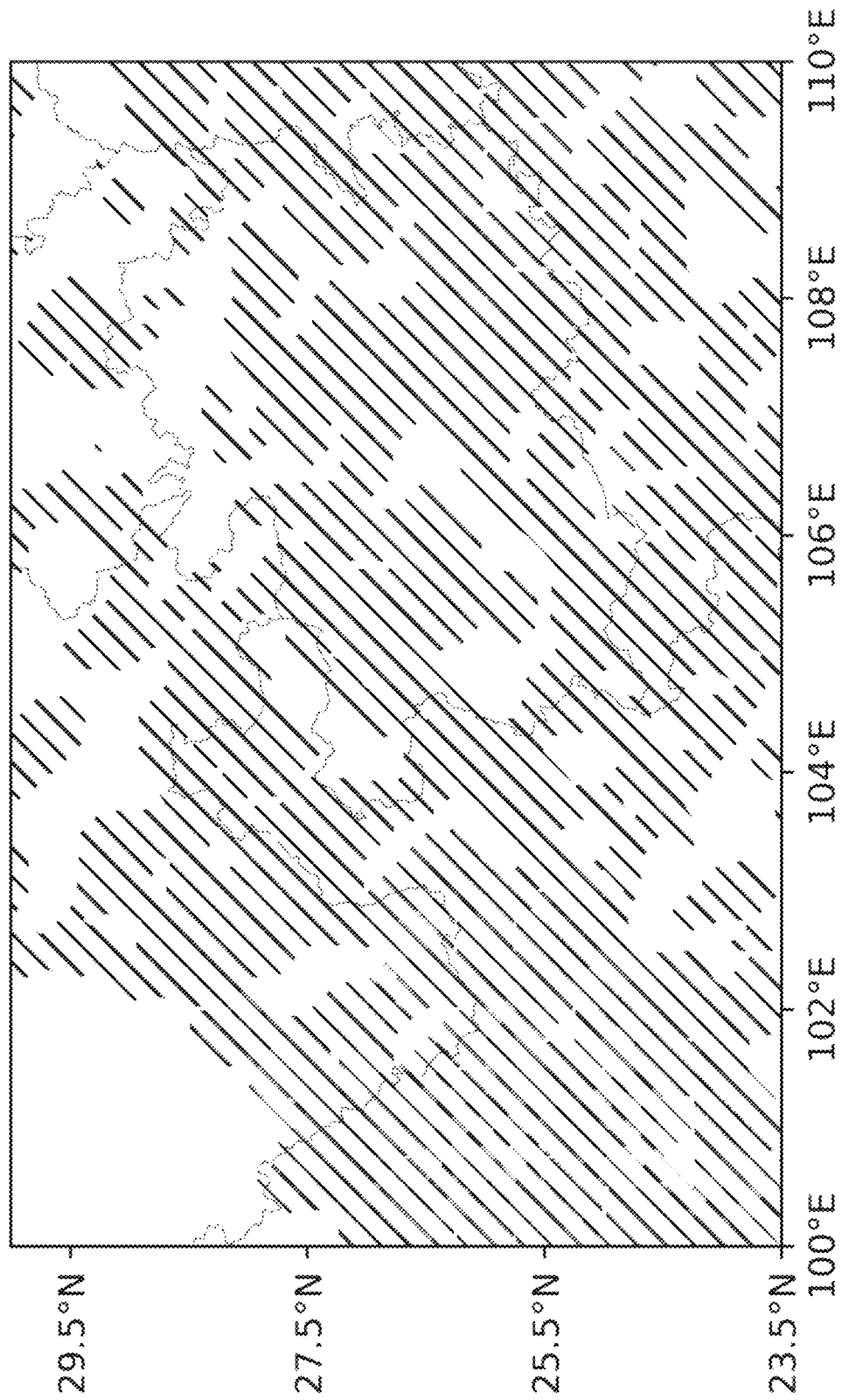
FIG. 12 is a schematic diagram of an initially selected inversion distribution satisfying the threshold according to the case of the present disclosure.
Figure 13:
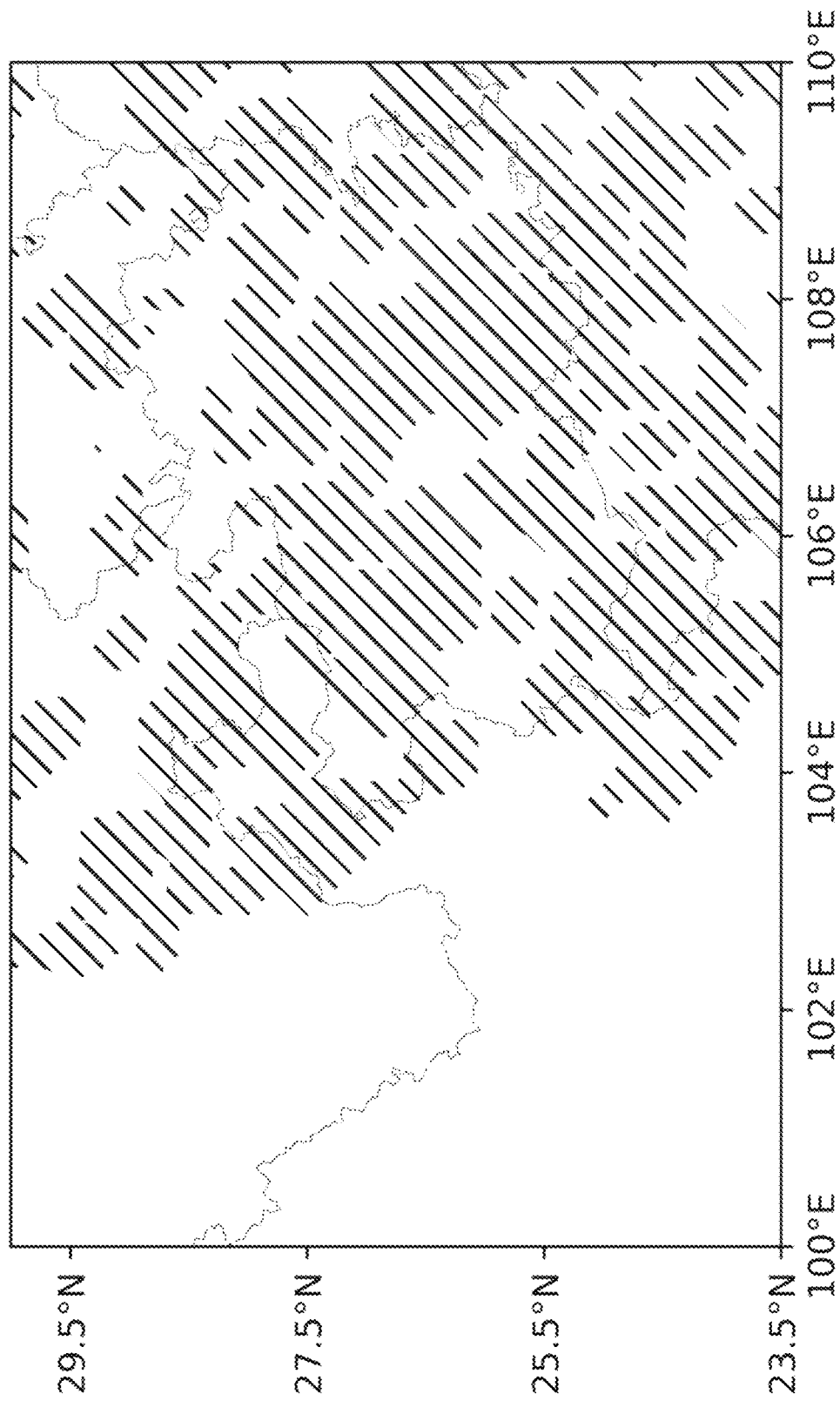
FIG. 13 is a schematic diagram of a frontal inversion distribution without a clear sky inversion according to the case of the present disclosure.
Figure 14:
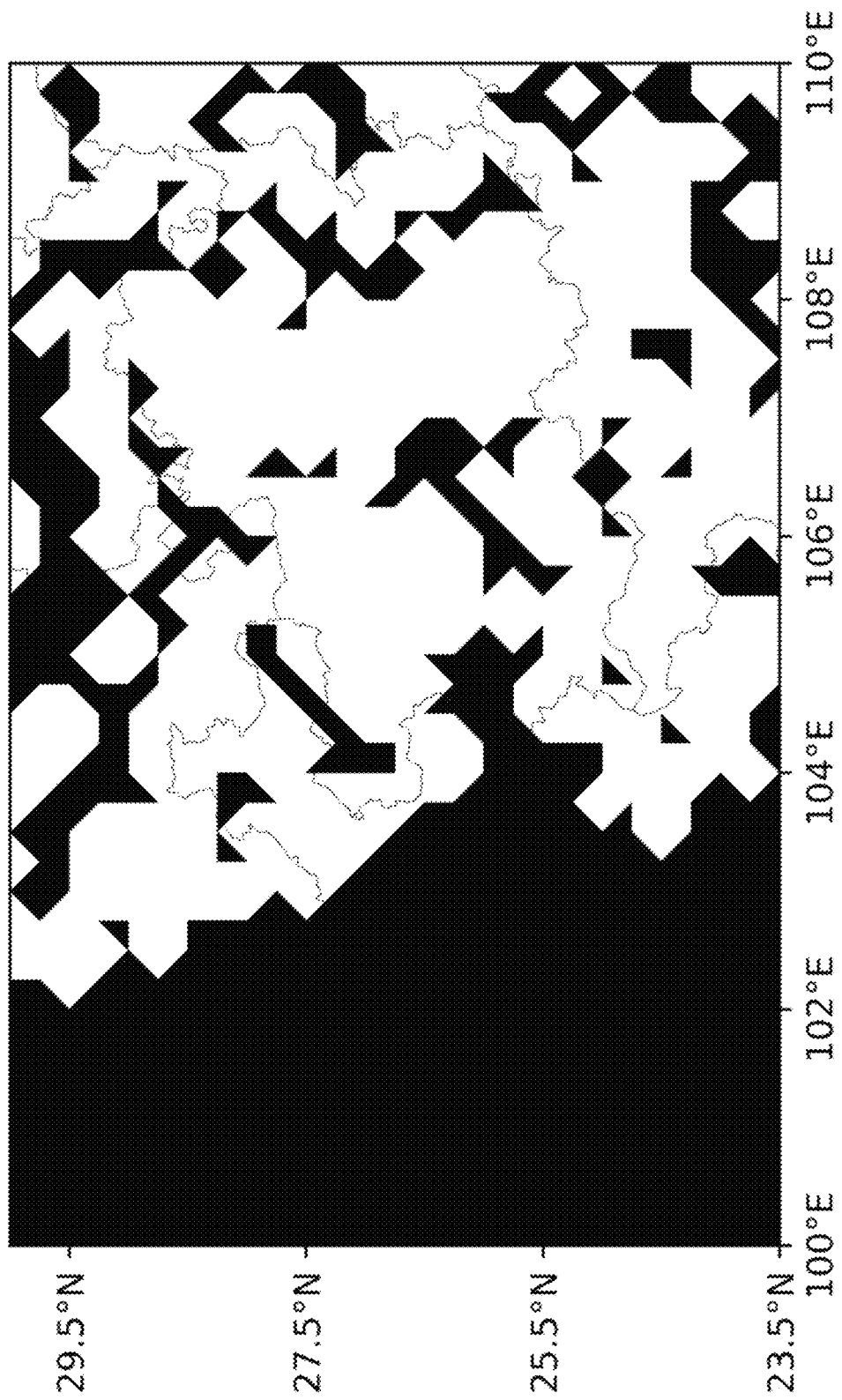
FIG. 14 is a schematic diagram of a binarized (0, 1) frontal inversion label according to the case of the present disclosure.
Figure 15:
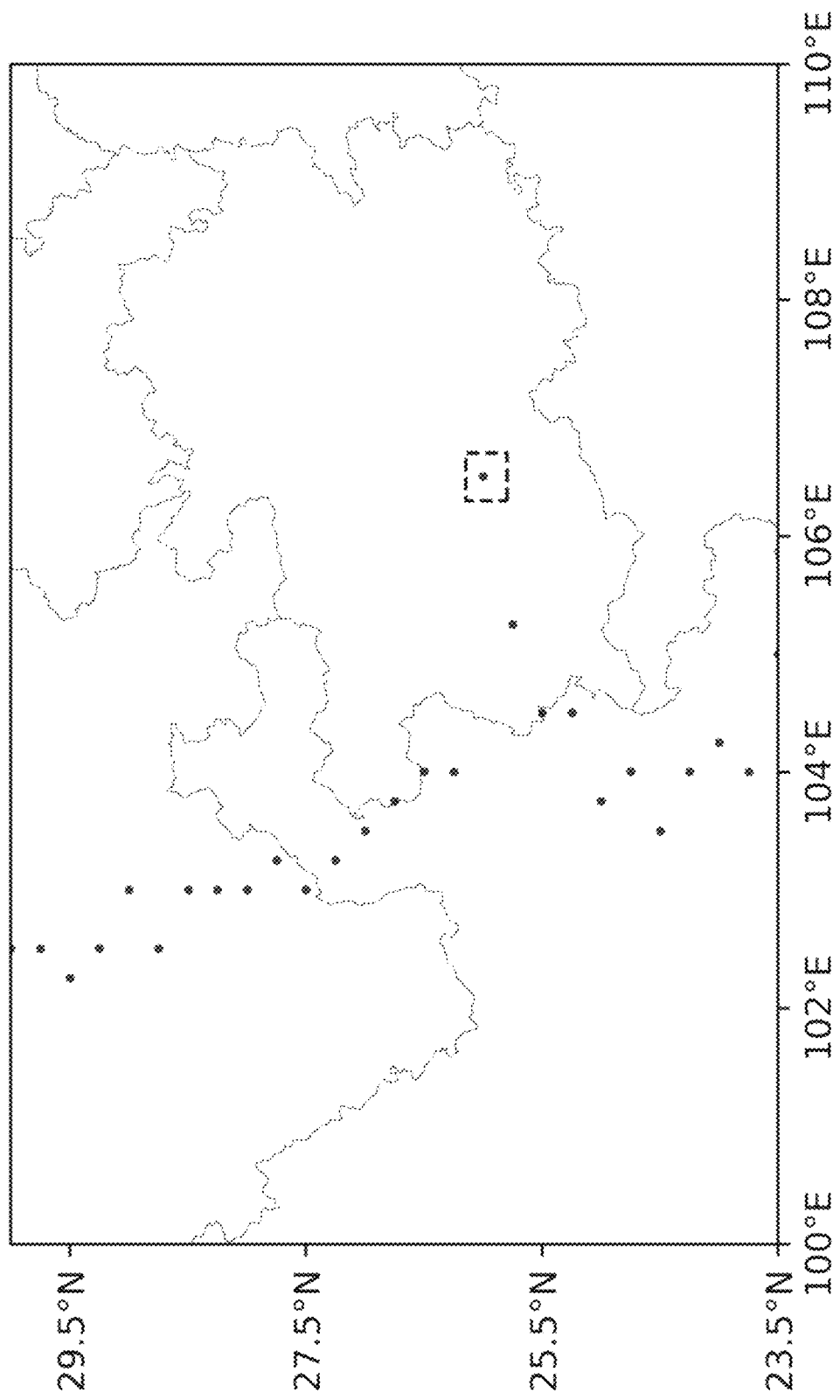
FIG. 15 is a schematic diagram of candidate frontal points according to the case of the present disclosure.
Figure 16:
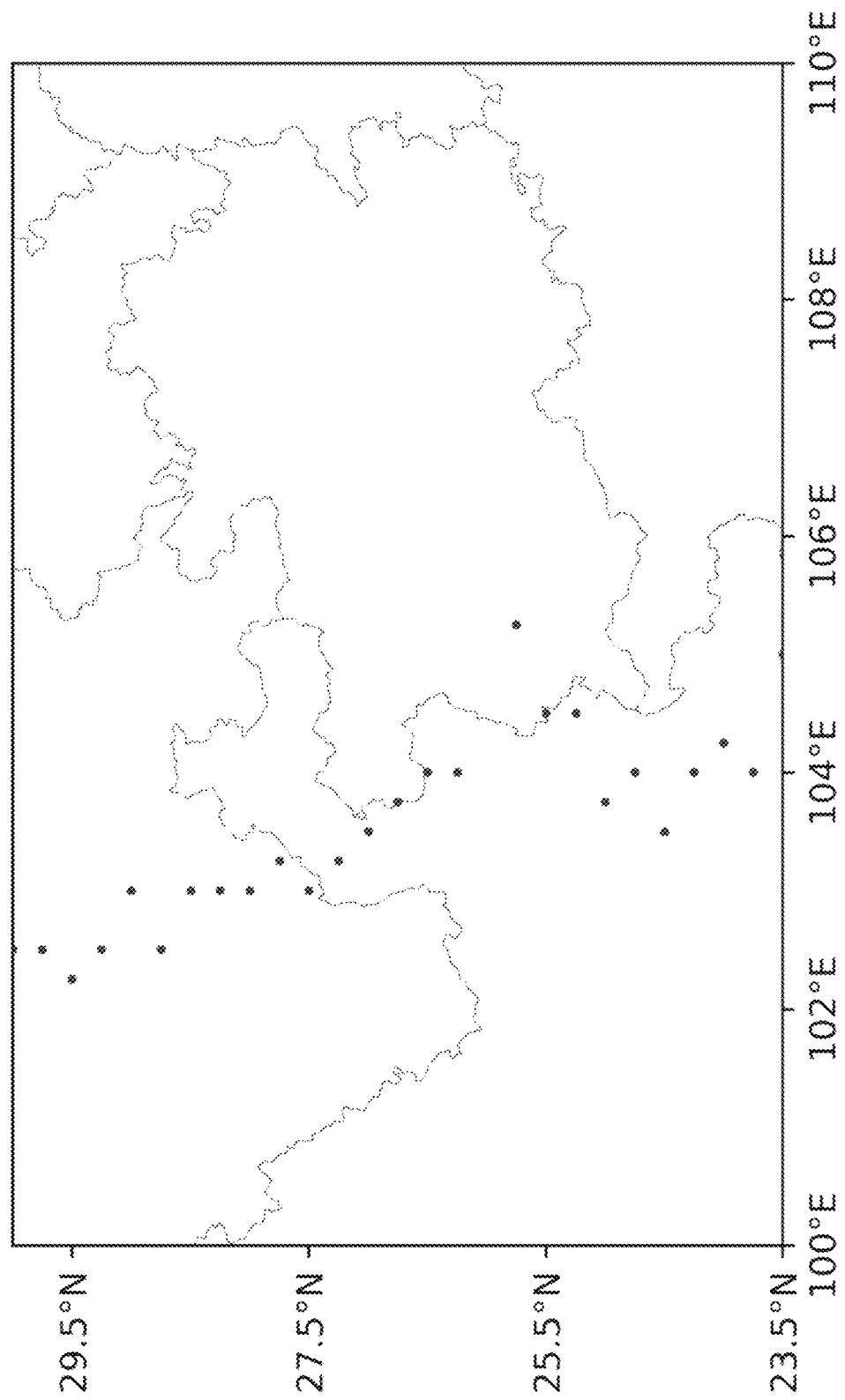
FIG. 16 is a schematic diagram of frontal nodes after noise elimination according to the case of the present disclosure.
Figure 17:
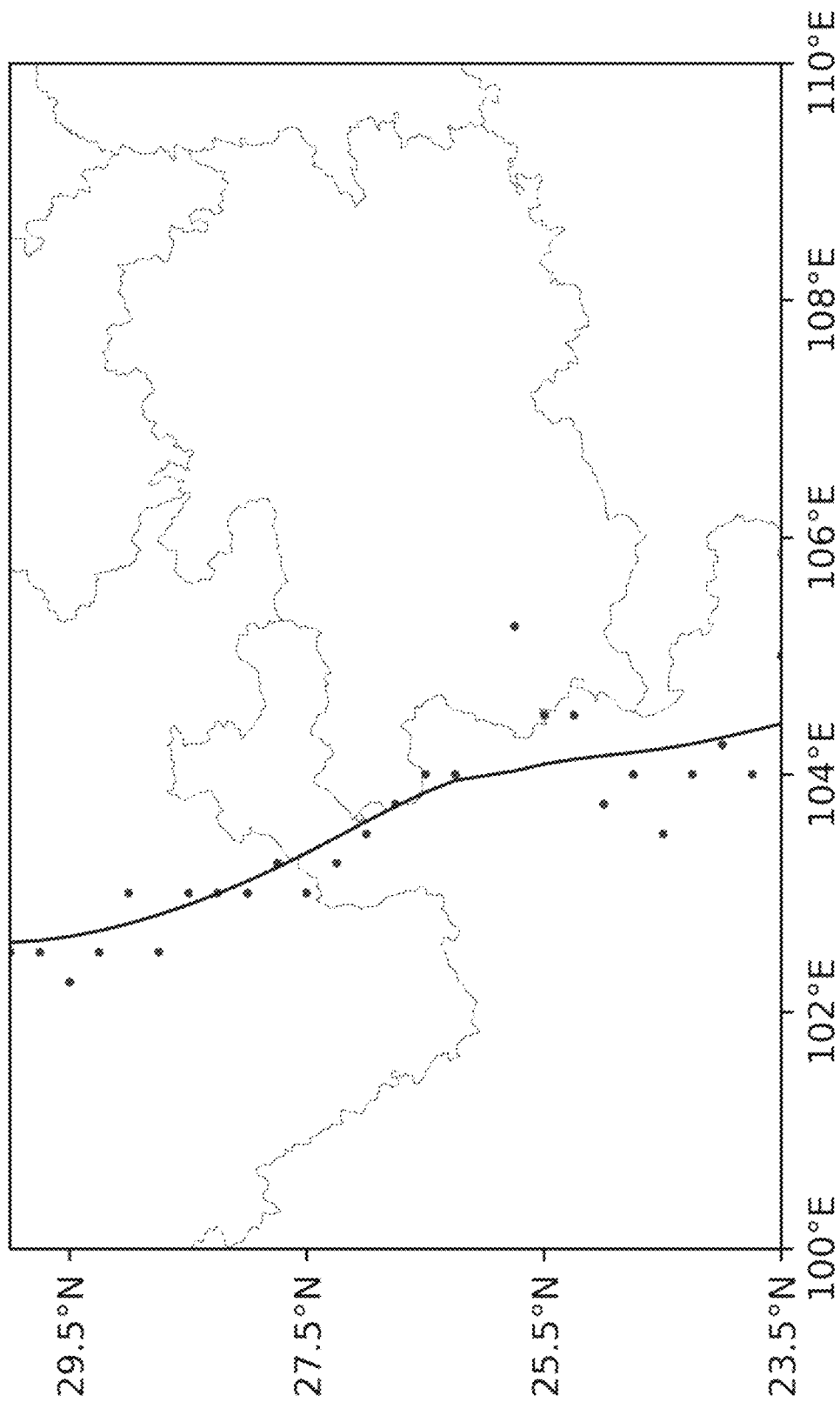
FIG. 17 is a schematic diagram of a quasi-stationary front in Kunming, Yunnan, China according to the case of the present disclosure.
Figure 18:
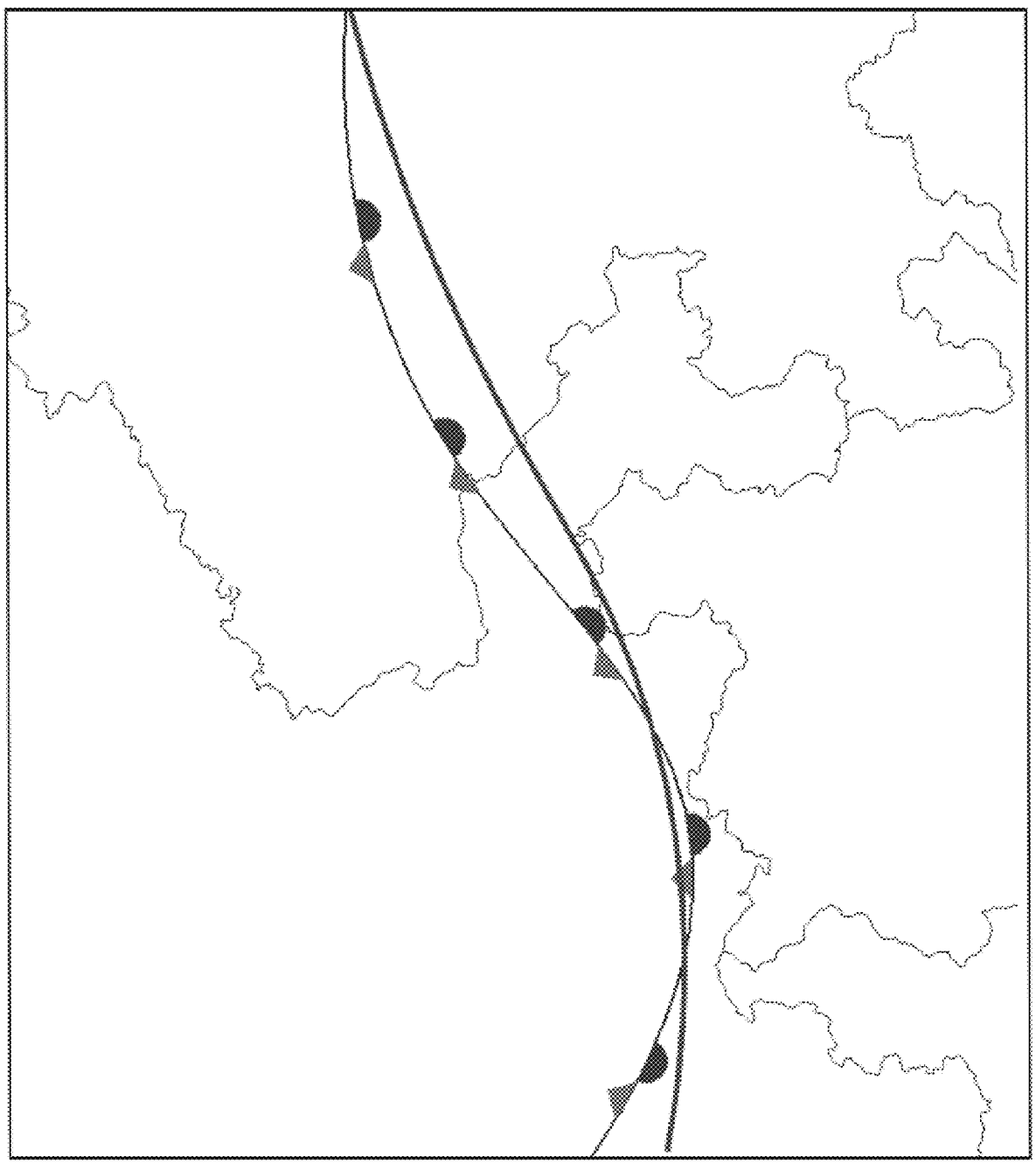
FIG. 18 is a schematic diagram showing a comparison between an automatic recognition result and a manual recognition result of the quasi-stationary front in Kunming, Yunnan, China.

In this embodiment, based on the data at 08:00 and 14:00 on Dec. 4, 2022 (Beijing time, the same below), the temperature lapse rate at 08:00 is calculated, as shown in FIG. 11. In the figure, / denotes a negative temperature lapse rate, and \ denotes a positive temperature lapse rate. Non-inversion points are removed according to the given preset threshold to acquire the initially selected inversion distribution at 08:00, as shown in FIG. 12. In the figure, the y axis denotes latitude, the x axis denotes longitude, and / denotes the area of the initially selected inversion distribution. In FIG. 12, the initially selected inversion distribution includes many clear sky radiation inversions. The clear sky radiation inversion points are removed according to step S4, and the result is shown in FIG. 13. In the figure, the y axis denotes latitude, the x axis denotes longitude, and / denotes the frontal inversion distribution after removing the clear sky radiation inversions. Binarization (0, 1) is performed according to the frontal inversion value assignment method, and the result is shown in FIG. 14. In the figure, the y axis denotes latitude, and the x axis denotes longitude. The candidate frontal points are extracted according to step S5, and the result is shown in FIG. 15. In the figure, the y axis denotes latitude, the x axis denotes longitude, and the box indicates an outlier. According to step S6, the noise of the candidate frontal point is removed to acquire the frontal nodes, as shown in FIG. 16. According to step S8, σ=4, and smooth filtering is performed on the longitude of the frontal nodes by one-dimensional Gaussian filtering to acquire the quasi-stationary front in Kunming, Yunnan, China, as shown in FIG. 17. A manually recognized quasi-stationary front in Kunming, Yunnan, China is shown in FIG. 18. In fact, FIG. 18 shows a comparison between the automatically recognized quasi-stationary front in Kunming, Yunnan, China and the manually recognized quasi-stationary front in Kunming, Yunnan, China at 08:00 on Dec. 4, 2022. In the figure, the smooth line represents an automatically recognized quasi-stationary front in Kunming, Yunnan, China, while the triangles and semicircles represent the manually recognized quasi-stationary front in Kunming, Yunnan, China.

In this embodiment, the following parameters from 30° N to 23.5° N are calculated.

A root mean square deviation (RMSD) is calculated as 24.97 km according to $$RMSD = \sqrt{\frac{\sum_i^n (lon_{Automatically\ recognized} - lon_{Manually\ recognized})^2}{n}} = 0.25.$$

The maximum difference is 39.95 km, and the minimum difference is 0 km.

A mean deviation (MD) is calculated as 20.97 km according to $$MD = \frac{\sum_i^n |lon_{Automatically\ recognized} - lon_{Manually\ recognized}|}{n} = 0.21.$$

The horizontal range of a weather scale system should be thousands of kilometers. In this embodiment, the RMSD and the MD are 24.97 km and 20.97 km respectively, with a maximum difference of 39.95 km and a minimum difference of 0 km. Comparative analysis shows that for the quasi-stationary front in Kunming, Yunnan, China, the analytical accuracy of the present disclosure is comparable to that of an experienced chief forecaster, offering satisfactory accuracy, higher objectivity, more prominent details, and significantly improved analysis speed.

The purpose of the present disclosure is to achieve automatic recognition of the quasi-stationary front in Kunming, Yunnan, China, in order to improve the efficiency and standardization level of weather analysis and forecasting, timely make correct analysis of weather systems, improve the automation level of weather analysis and forecasting, and promote meteorological disaster prevention and mitigation work in provinces such as Yunnan, Guizhou, and downstream areas of China.

What is claimed is:

1. An automatic recognition method for a dry quasi-stationary front in Kunming, Yunnan, China, comprising the following steps:

S1: physically measuring, with a sounding balloon, from an atmosphere an atmospheric temperature at 2 m above a point at ground surface and an atmospheric temperature at each layer of each point, where each point denotes a respective horizontal position and each layer denotes a respective height that is between the ground surface and a height corresponding to 650 hPa, and obtaining geopotential height data;

S2: calculating, by a differential method, a temperature lapse rate between each layer of each point between the ground surface and the height corresponding to 650 hPa, and acquiring a maximum inversion trend value of each point;

S3: acquiring an initially selected inversion distribution based on the maximum inversion trend value;

wherein step S3 comprises the following sub-steps:

S301: taking γ' as a preset threshold in consideration of three types of inversion: weak lapse, strong inversion, and isothermal;

S302: acquiring the initially selected inversion distribution when the maximum inversion trend value is less than or equal to the preset threshold γ', wherein γ'=0.1° C./100 m; and S303: determining that there is no quasi-stationary front in Kunming, Yunnan, China if there is no inversion at any point in an analysis area, and ending a recognition process;

S4: removing a nighttime clear sky radiation inversion from the initially selected inversion distribution, retaining only a frontal inversion, and binarizing (0, 1);

S5: finding a boundary between inversion and non-inversion on a binarized (0, 1) inversion distribution, and acquiring candidate frontal points;

S6: calculating an east-west distance between each of the candidate frontal points and an overall average position thereof, removing an abnormal candidate frontal point based on the east-west distance, and acquiring frontal nodes;

S7: removing meso- and micro-scale systems; and

S8: performing one-dimensional Gaussian filtering on longitude data of the frontal nodes based on a removal result, and connecting the filtered frontal nodes to acquire a quasi-stationary front in Kunming, Yunnan, China, wherein in step S8, the one-dimensional Gaussian filtering is expressed as follows:

$$G(x) = \frac{1}{\sqrt{2\pi}\sigma} e^{-\frac{x^2}{2\sigma^2}}$$

wherein, G(x) denotes a curve acquired after the one-dimensional Gaussian filtering; σ denotes a smoothing parameter; σ=4 and x denotes a data sequence for filtering; and e denotes a natural constant.

2. The automatic recognition method for the dry quasi-stationary front in Kunming, Yunnan, China according to claim 1, wherein the temperature lapse rate is expressed as follows:

$$\gamma = -\frac{\partial T}{\partial Z} = -\frac{\Delta T}{\Delta Z}$$

wherein, $\gamma$ denotes the temperature lapse rate; T denotes an atmospheric temperature; Z denotes an altitude; $\partial$ denotes a partial derivative operation; $\Delta T$ denotes a difference between an upper atmospheric temperature and a lower atmospheric temperature; and $\Delta Z$ denotes a difference between an upper geopotential height and a lower geopotential height.

3. The automatic recognition method for the dry quasi-stationary front in Kunming, Yunnan, China according to claim 1, wherein step S4 comprises the following sub-steps:

S401: comparing initially selected inversion distributions in morning and afternoon, and determining whether there are inversion distributions at a same point in the morning and the afternoon; if yes, determining that there is a frontal inversion at the point, retaining the point, and setting a frontal inversion label of the point as $\gamma'=1$; if not, determining that there is a clear sky radiation inversion at the point, and setting the frontal inversion label of the point as $\gamma'=0$; and setting the frontal inversion label of a non-inversion point as $\gamma'=0$;

S402: setting the frontal inversion labels of all points as $\gamma'=0$ if there is no frontal inversion in an analysis area; and specifically, determining that there is no quasi-stationary front in Kunming, Yunnan, China, and ending a recognition process; and S403: acquiring, based on a result acquired in step S401, a binary (0, 1) $\gamma'$ value distribution map that only retains the frontal inversion.

4. The automatic recognition method for the dry quasi-stationary front in Kunming, Yunnan, China according to claim 3, wherein in step S5, the finding the boundary between the inversion and the non-inversion specifically comprises:

extracting, based on the binary (0, 1) $\gamma'$ value distribution map, boundary points of 0 and 1 as the candidate frontal points.

5. The automatic recognition method for the dry quasi-stationary front in Kunming, Yunnan, China according to claim 1, wherein step S6 comprises the following sub-steps:

S601: calculating the east-west distance between each of the candidate frontal points and the overall average position thereof; and S602: determining whether the east-west distance is greater than a preset east-west distance threshold; if yes, deeming the candidate frontal point as a noise point and removing the candidate frontal point; and if not, retaining the candidate frontal point as a frontal node.

6. The automatic recognition method for the dry quasi-stationary front in Kunming, Yunnan, China according to claim 1, wherein in step S7, the removing the meso- and micro-scale systems specifically comprises:

determining whether a distance between north and south top frontal nodes is less than a north-south distance threshold; if yes, determining that there is no quasi-stationary front in Kunming, Yunnan, China, and ending a recognition process; and if not, proceeding to step S8.

7. A method for meteorological disaster mitigation comprising:

performing the method of claim 1 to determine the quasi-stationary front in Kunming, Yunnan, China; and mitigating a meteorological disaster instigated by the quasi-stationary front in at least one of Yunnan province, China, Guizhou, China or areas downstream from Yunnan province, China or Guizhou, China.

\* \* \* \* \*